(12) United States Patent
Edwards et al.

(10) Patent No.: US 8,903,863 B2
(45) Date of Patent: Dec. 2, 2014

(54) USER INTERFACE WITH AVAILABLE MULTIMEDIA CONTENT FROM MULTIPLE MULTIMEDIA WEBSITES

(75) Inventors: John Edwards, Orem, UT (US); Nathan Edwards, Orem, UT (US); David Brueck, Saratoga Springs, UT (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/619,214

(22) Filed: Sep. 14, 2012

(65) Prior Publication Data
US 2013/0014014 A1    Jan. 10, 2013

Related U.S. Application Data

(63) Continuation of application No. 12/253,697, filed on Oct. 17, 2008, now Pat. No. 8,321,401.

(51) Int. Cl.
| | |
|---|---|
| G06F 17/30 | (2006.01) |
| H04N 21/81 | (2011.01) |
| H04N 5/445 | (2011.01) |
| H04N 21/235 | (2011.01) |
| H04N 21/472 | (2011.01) |
| H04N 21/61 | (2011.01) |

(52) U.S. Cl.
CPC ...... *G06F 17/3089* (2013.01); *G06F 17/30849* (2013.01); *G06F 17/30817* (2013.01); *H04N 21/8153* (2013.01); *H04N 5/44543* (2013.01); *H04N 21/2355* (2013.01); *H04N 21/472* (2013.01); *H04N 21/6125* (2013.01)
USPC ............ 707/791; 707/802; 707/822; 707/828

(58) Field of Classification Search
CPC ....................................................... G06F 17/30
USPC .................................................. 707/600–899
See application file for complete search history.

(56) References Cited

U.S. PATENT DOCUMENTS

| 4,535,355 A | 8/1985 | Arn et al. |
| 5,953,506 A | 9/1999 | Kalra et al. |

(Continued)

FOREIGN PATENT DOCUMENTS

WO       02075482 A2    9/2002

OTHER PUBLICATIONS

USPTO "International Search Report" mailed Dec. 12, 2008; International Appln. No. PCT/US2008/061035, filed Apr. 21, 2008.

(Continued)

*Primary Examiner* — Isaac M Woo
(74) *Attorney, Agent, or Firm* — Ingrassia Fisher & Lorenz, P.C.

(57) ABSTRACT

Automatically and repeatedly crawling multiple multimedia websites to identify and collect information about the multimedia content that is available for delivery over the Internet to a client device for playback on a media player operating on the client device. In one embodiment, the method normalizes the collected information by converting the different formats of the collected information into a common format and converting the different nomenclatures of the collected information into a common nomenclature. The method updates an index with the normalized information, and sends a data feed to the client device to populate the user interface on the client device with the normalized information of the index. The user interface allows the user to navigate and select the multimedia content that is available for delivery over the Internet for playback on the media player.

16 Claims, 12 Drawing Sheets

(56) References Cited

U.S. PATENT DOCUMENTS

| | | |
|---|---|---|
| 6,195,680 B1 | 2/2001 | Goldszmidt et al. |
| 6,366,614 B1 | 4/2002 | Pian et al. |
| 6,389,473 B1 | 5/2002 | Carmel et al. |
| 6,449,719 B1 | 9/2002 | Baker |
| 6,486,803 B1 | 11/2002 | Luby et al. |
| 6,490,627 B1 | 12/2002 | Kalra et al. |
| 6,574,591 B1 | 6/2003 | Kleiman et al. |
| 6,604,118 B2 | 8/2003 | Kleiman et al. |
| 6,976,090 B2 | 12/2005 | Ben-Shaul et al. |
| 7,228,305 B1 | 6/2007 | Eyal et al. |
| 7,231,381 B2 | 6/2007 | Li et al. |
| 7,240,100 B1 | 7/2007 | Wein et al. |
| 7,308,643 B1 | 12/2007 | Zhu et al. |
| 7,366,972 B2 | 4/2008 | Baumert et al. |
| 7,408,984 B2 | 8/2008 | Lu et al. |
| 7,523,181 B2 | 4/2009 | Swildens et al. |
| 8,321,401 B2 | 11/2012 | Edwards et al. |
| 2001/0005890 A1* | 6/2001 | Nitaki ............... 713/202 |
| 2002/0073220 A1 | 6/2002 | Lee |
| 2002/0144276 A1 | 10/2002 | Radford et al. |
| 2002/0152318 A1 | 10/2002 | Menon et al. |
| 2002/0188745 A1 | 12/2002 | Hughes et al. |
| 2002/0189427 A1* | 12/2002 | Pachet ............... 84/609 |
| 2003/0005455 A1 | 1/2003 | Bowers |
| 2003/0014684 A1 | 1/2003 | Kashyap |
| 2003/0135631 A1 | 7/2003 | Li et al. |
| 2003/0151753 A1 | 8/2003 | Li et al. |
| 2003/0152036 A1 | 8/2003 | Quigg Brown et al. |
| 2003/0154239 A1 | 8/2003 | Davis et al. |
| 2003/0204519 A1 | 10/2003 | Sirikvara et al. |
| 2004/0003101 A1 | 1/2004 | Roth et al. |
| 2004/0030547 A1 | 2/2004 | Leaning et al. |
| 2004/0031054 A1 | 2/2004 | Dankworth et al. |
| 2004/0054551 A1 | 3/2004 | Ausubel et al. |
| 2004/0083283 A1 | 4/2004 | Sundaram et al. |
| 2004/0093420 A1 | 5/2004 | Gamble |
| 2004/0103444 A1 | 5/2004 | Weinberg et al. |
| 2004/0143672 A1 | 7/2004 | Padmanabham et al. |
| 2004/0170392 A1 | 9/2004 | Lu et al. |
| 2004/0177096 A1 | 9/2004 | Eyal et al. |
| 2004/0199657 A1 | 10/2004 | Eyal et al. |
| 2005/0002452 A1 | 1/2005 | Dufaux et al. |
| 2005/0108414 A1 | 5/2005 | Taylor et al. |
| 2005/0120107 A1 | 6/2005 | Kagan et al. |
| 2005/0188051 A1 | 8/2005 | Sneh |
| 2005/0283791 A1* | 12/2005 | McCarthy et al. ............... 725/1 |
| 2006/0080718 A1 | 4/2006 | Gray et al. |
| 2006/0206246 A1 | 9/2006 | Walker |
| 2007/0088678 A1 | 4/2007 | Farago et al. |
| 2007/0107032 A1* | 5/2007 | Rachamadugu ............... 725/114 |
| 2007/0155306 A1 | 7/2007 | Koli et al. |
| 2007/0208718 A1 | 9/2007 | Javid et al. |
| 2007/0220575 A1 | 9/2007 | Cooper et al. |
| 2007/0239848 A1 | 10/2007 | Avery |
| 2007/0299828 A1* | 12/2007 | Lewis et al. ............... 707/3 |
| 2007/0300258 A1 | 12/2007 | O'Connor et al. |
| 2008/0005348 A1 | 1/2008 | Kosiba et al. |
| 2008/0005676 A1 | 1/2008 | Evans et al. |
| 2008/0016531 A1 | 1/2008 | Eyal et al. |
| 2008/0033998 A1 | 2/2008 | Rao et al. |
| 2008/0034029 A1 | 2/2008 | Fang et al. |
| 2008/0059989 A1 | 3/2008 | O'Connor et al. |
| 2008/0155627 A1 | 6/2008 | O'Connor et al. |
| 2008/0162713 A1 | 7/2008 | Bowra et al. |
| 2008/0219151 A1 | 9/2008 | Ma et al. |
| 2009/0019364 A1 | 1/2009 | Cho et al. |
| 2009/0070114 A1* | 3/2009 | Staszak ............... 704/260 |
| 2009/0089266 A1 | 4/2009 | Gollapudi et al. |
| 2009/0106202 A1 | 4/2009 | Mizrahi |
| 2009/0192752 A1 | 7/2009 | Powers et al. |
| 2009/0232479 A1 | 9/2009 | Watanabe et al. |
| 2010/0042747 A1 | 2/2010 | Hascalovici et al. |
| 2010/0094897 A1* | 4/2010 | Sumrall et al. ............... 707/769 |
| 2010/0095219 A1* | 4/2010 | Stachowiak et al. ............... 715/745 |
| 2011/0191667 A1 | 8/2011 | Sahota et al. |

OTHER PUBLICATIONS

Oren, Eyal et al. "Active RDF: Embedding Semantic Web Data Into object-Oriented Languages" Elsevier 2008; Web Semantics: Science, Services adn Agents on the World Wide Web.

Bottoni, Paolo et al "MADCOW: A Multimedia Digital Annotation System" ACM 2004, Bibliometrics Data Bibliometrics.

Pfeiffer, Silvia, et al. "The Continuous Media Web: A Distributed Multimedia Information Retrieval Architecture Extending the World Wide Web" Springer-Verlag 2005, Published online Aug. 8, 2005.

Pieper, Jan et al. "Streaming_Media Knowledge Discovery" IEEE, Sep. 2001.

Trappery, Amy J.C. et al. "Global Content Management Services for Product Providers and Purchasers" Department of Industrial Engineering and Engineering Management, National Tsing Hua University, May 23, 2003.

* cited by examiner

USER INTERFACE WITH AVAILABLE MULTIMEDIA CONTENT FROM MULTIPLE MULTIMEDIA WEBSITES

BACKGROUND

1. Field

Embodiments of the invention relate to the field of online multimedia content; and more specifically, to available multimedia content from multiple unrelated multimedia websites for delivery for playback on a client device.

2. Background

The Internet is becoming a primary method for distributing multimedia content (e.g., video, audio, etc) to end users. It is currently possible to download or stream music, video, games, and other multimedia content to computers, cell phones, and virtually any network capable device.

Conventionally, a user desiring to play multimedia content over the Internet will typically browse the web by individually visiting one multimedia website to find which multimedia content the user wishes to play. For example, one user may type in a Uniform Resource Locator (URL) of a content provider's website, such as http://www.xyzcom, to browse the multimedia content that is available at the individual website. However, sometimes a user does not know which content provider actually owns the multimedia content, thus requiring the user to possibly visit multiple multimedia websites to find the desired multimedia content. Also, if the user only visits one multimedia website, the user will be limited to only the multimedia content that is available on that particular website. Alternatively, a user may type in a search term into a search engine in order to find the content, but such searches may return various results, requiring the user to individually visit multiple websites to find the desired content. In general, viewing multimedia content using conventional methods requires the user to navigate through multiple websites and multiple webpages of these websites to find the desired multimedia content. As such, these conventional methods require the user to be knowledgeable about how to navigate each of these websites to find the desired multimedia content, since these multimedia websites are possibly operated by different entities and have entirely different websites. Also, these conventional methods required the user to have different media players to playback the desired multimedia content. For example, one multimedia website may require a user to download a proprietary media player to play the multimedia content from the one website, and another website may require a completely different media player to play multimedia content from the other website. Also, using these conventional methods it is difficult for the user to stay aware of newly available multimedia content, because the user would have to return to the multimedia website and manually determine whether there is newly available content. Not only may each of these multimedia websites have different user interfaces, the viewing experience using these conventional methods is not optimized for 'living-room' viewing, where a user is sitting on a couch away from the computer. Although the number of people playing multimedia content at their computers has increased, many users do not use the Internet for playing multimedia content due to the difficulty of finding the desired multimedia content at various locations, the differences between user interfaces, and because they have to be sitting at their computer to navigate through the various webpages, as described above.

In an attempt to overcome some of the problems discussed above, another method for multimedia content delivery may aggregate multimedia content from various content providers into a single multimedia website by purchasing the multimedia content from various content providers. These types of websites are sometimes referred to as content aggregation sites or content portals that offer online video services. These types of web sites employ a portal strategy, in that each of these sites requires the user to search for available multimedia content within their own website, although some of the content may be from various content providers. Using the portal strategy, the available multimedia content is limited to the licensed multimedia content purchased by the content aggregation site. This may be a limiting factor for a user wishing to play multimedia content that has not been purchased by the particular content aggregation site, but is otherwise available on another multimedia website.

These types of content aggregation sites charge content owners high fees and the content owners generally lose control of the user experience. These content aggregation sites are often in direct competition with the content owners own multimedia website. Also, since content owners lose control of the user experience, the content owners may loss revenue generating opportunities with advertisements and promotions. Moreover, by selling the multimedia content to the content aggregation sites, the content owners may not be building viewership on its own website.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
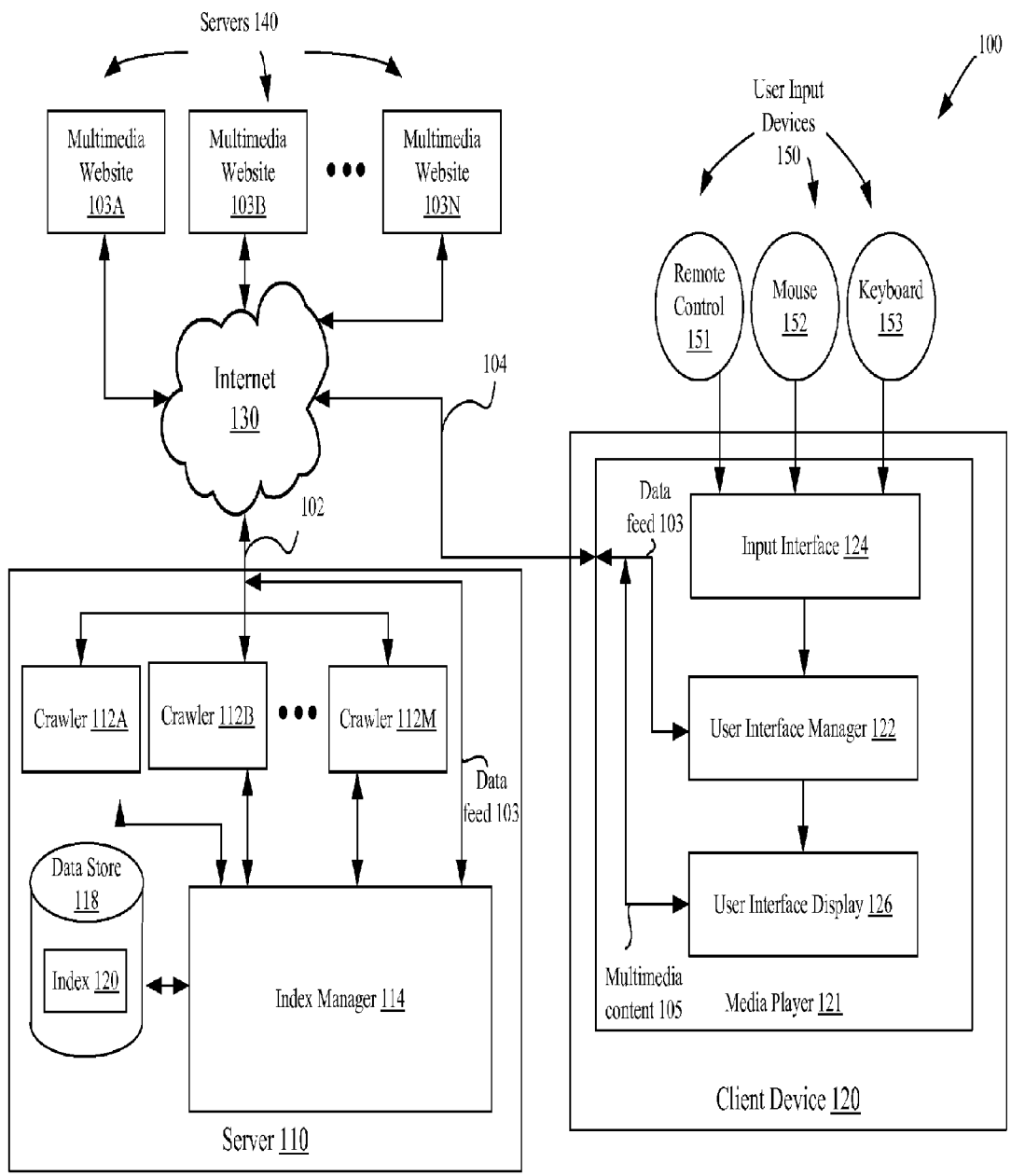
FIG. 1 is a schematic block diagram illustrating one embodiment of a computing environment in which a user interface with available multimedia content from multiple multimedia websites may be used.

The following description describes embodiments of sending a data feed to a client device to populate a single user interface with normalized information of the index to allow a user to navigate and select multimedia content is available for delivery over the Internet for playback on the media player operating on the client device. In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Many of the functional units described in this specification have been labeled as logic blocks, engines, or managers, in order to more particularly emphasize their implementation independence. For example, the separate blocks may be implemented as a hardware circuit comprising custom integrated circuits or gate arrays, off-the-shelf semiconductors such as logic chips, transistors, or other discrete components. Theses blocks may also be implemented in programmable hardware devices such as field programmable gate arrays, programmable array logic, programmable logic devices, or the like. These blocks may also be implemented in software for execution by various types of computing devices. An identified block may include executable code, which may, for instance, include one or more physical or logical blocks of computer instructions which may, for instance, be organized as an object, procedure, or function. Nevertheless, the executables of an identified block need not be physically located together, but may include disparate instructions stored in different locations which, when joined logically together, form the block, and achieve the stated purpose for the block. Indeed, a block may include executable code, which may be a single instruction, or many instructions, and may even be distributed over several different code segments, among different programs, and across several memory devices. Similarly, operational data may be identified and illustrated herein within the blocks, and may be embodied in any suitable form and organized within any suitable type of data structure. The operational data may be collected as a single data set, or may be distributed over different locations including over different storage devices.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments described in provide an easy way for users to navigate, select, and play multimedia content from many different online multimedia websites, but with a single consistent user interface, despite the fact that there is no collaboration among the different online multimedia websites. The embodiments described herein allow a user to control of the user interface via a physical input device, such as a remote control device. Unlike the conventional methods where the user browses the Internet using a mouse or keyboard to visit website individually, the embodiments described herein allow a user to navigate, select, and play content using a simple remote control, so it is more suited to a 'living-room' viewing experience. In one embodiment, the users can be notified when new multimedia content is available from any website, and can create a queue of content to watch across many unrelated multimedia websites. The content owners' websites are not modified, so the content owners benefit from larger audiences without high costs or loss of control, as described above with respect to the conventional methods.

The embodiments herein describe a server-side process that indexes available multimedia content from multiple sites, such as those of television networks, as well as from content aggregation sites. Such indexing creates an aggregate view of the multimedia content that is available for delivery over the Internet to a client device for playback on a media player operating on the client device.

In one embodiment, the users download a desktop application that accesses information about the multimedia content on the respective servers hosting the multimedia websites, and uses it to present the user with and a simple navigation interface. The application knows how to detect and put from various input devices, for example, physical remote control devices, such as the Apple remote, available from Apple, Inc., the Nintendo Wii remote, available from Nintendo, Co., or other remote control devices, as would be appreciated by one of ordinary skill in the art. Thus, a when the a user's computer is coupled to a TV, via a video cable or wirelessly, and the user can watch multimedia content available for delivery over the Internet on their TV, and control the application without needing to be near the computer itself. These embodiments provide the user with a 'living-room' viewing experience, unlike the conventional method. When the user selects a piece of multimedia content to watch, the application displays the content owner's multimedia website so that the normal viewing experience, as designed by the content owner, is still used. Included in the viewing experience are any advertisements the content owner chooses to display. The use of this application does not disrupt the content owner's revenue model. Users are still able to use the remote control to navigate, select, and play the multimedia content from the content owner's website, even though the content owner's website was not designed to be aware of the input from the remote control. Even though the multimedia content is played on the content owners, websites, the application is still running so that the user can interrupt playback and navigate to other multimedia content. The application may have a unique identifier that can be used to report what multimedia content the user selects. Over time, the application can deduce a preference profile for the user to help suggest multimedia content that may be interesting to the user, even multimedia that belongs to a different content provider. Also, statistics collected by the application may be used for marketing, and can be sold to advertisers.

The embodiments described herein provide another way to consume online multimedia content. The viewing experience may be used by content providers to build viewership at their respective website, and thus, does not directly compete with content providers for viewership, unlike the portal strategy of the conventional methods. Unlike the conventional content aggregation sites which take away control of the viewing experience, the embodiment described herein preserve the content owner's presentation, advertisements, promotions, and other aspects of the overall viewer experience with the multimedia content that is available for delivery over the Internet from the content owner's website.

FIG. 1 is a schematic block diagram illustrating one embodiment of a computing environment 100 in which a distributed user interface with available multimedia content from multiple multimedia websites may be used. The computing environment 100 includes servers 140 that host multiple multimedia website 103A-N. The multimedia websites 103 contain multimedia content 105 that is available for delivery over the Internet 130 to other computing devices, such as a client device 120. The multimedia content 105 may be delivered over the Internet 130 to the client device 120 by various methods, such as by downloading, streaming, progressive downloading, or the like. The multimedia content 105 may be delivered by the server 140 that is hosting the multimedia website 103. Alternatively, the multimedia content 105 may be delivered by the content owner's web site, or from a separate server, such as a media server, a cache server, or the like. The multimedia content 105 may include video, such as TV shows, movies, or the like, or audio, such as music, radio broadcasts, podcasts, or the like. The multimedia content 105 may be on-demand multimedia content, or live video programming, such as video programming offered by major media companies. The multimedia content may be stored in one or more files including data corresponding to video and/or audio, such as video and/or audio corresponding to a television broadcast, sporting event, movie, music, concert, or the like. The client device 120 is coupled to the Internet 130 using a network connection 104. A media player 121, operating on the client device 120, receives the multimedia content 105 over the Internet 130 from one of the multimedia websites 103A-N. The media player 121 may be computer software for playing back multimedia files, and may support various media formats, including both audio and video files. In one embodiment, the media player 121 includes software operating on a computing device that has a network connection to connect to the Internet 130. In one embodiment, the media player 121 may be software that is downloaded to the client device 120 prior to the user viewing the requested multimedia content. The media player 121 includes a user interface, and is configured to receive the data feed 103 from the server 110 to populate the user interface on the client device 120. The data feed 103 includes normalized information about the multimedia content 105 that is available for delivery over the Internet 130, as described below. The user interface allows a user to navigate and select the multimedia content that is available for delivery over the Internet 130 for playback on the media player 121.

It should be noted that although the computing environment 100 uses the Internet 130, in other embodiments, other types of networks may be used, such as a Local Area Network (LAN), a Personal Area Network (PAN), a Campus Area Network (CAN), a Metropolitan area network (MAN), other types of Wide area networks (WANs), wireless local area network, cellular network, virtual local area network, or the like. Also, although the multimedia websites 103 are hosted by the servers 140, in other embodiments, the available multimedia content of the multimedia websites 103 may be delivered by proxy servers, cache servers of an Internet Service Provider (ISP), proxy caches, content servers, or any other network infrastructure operators. In another embodiment, the multimedia content may be delivered by a content delivery network (CDN). The client device 120 may be a client workstation, a server, a computer, a portable electronic device, an entertainment system configured to communicate over a network, such as a set-top box, a digital receiver, a television, or the like. For example, portable electronic devices may include, but are not limited to, cellular phones, portable gaming systems, portable computing devices, or the like. The client device 120 may have access to the Internet 130 via a firewall, a router, or other packet switching devices.

In one embodiment, the media player 121 is an add-on or plug-in of a web browser application. A web browser application, commonly referred to as a web browser, is a software application which enables a user to display and interact with text, images, video, music, and other information typically located on a webpage at a website on the World Wide Web (WWW) or a local area network (LAN). A plug-in is a computer program that interacts with a host application, such as the web browser to provide a certain function. The plug-in may extend the host application. The plug-in media player 121 receives the multimedia content 105 over the network connection 104 and plays the multimedia content on the user interface display 126. In another embodiment, the media player 121 is a stand-alone application that receives the multimedia content 105 over the Internet from one of the multimedia websites 103A-N, and plays back the multimedia content 105 to the user on the user interface display 126. It should be noted that the embodiments described herein do not require that the multimedia content be delivered from the content owner's website, or from the same web server hosting the multimedia website, but may be delivered from a separate server, such as a media server, a cache server, or the like. In another embodiment, the user interface manager 122, input interface 124, and the user interface display 126 may be integrated into a plug-in for a web browser application. For example, when the user launches the web browser application, the user interface may generate as an overlay to the webpage as launched, or as a widget as part of a home page or of a social networking site. Alternatively, the user interface may be implemented in applications as would be appreciated by one of ordinary skill in the art.

It should be noted that additional detail regarding how the media player 121 receives and plays back the multimedia content 105 have not been included, as they would be appreciated by one of ordinary skill in the art. Also, as described above, the embodiments described herein may be used with multimedia websites that deliver the multimedia content in various manners, such as downloading, streaming, progressive downloading, or the like.

A server 110 is coupled to the Internet 130 using a network connection 102. The server 110 includes multiple crawlers 112A-M to access the servers 140 hosting the multiple multimedia websites 103A-N over the network connection 102. The crawlers 112 automatically and repeatedly crawl the servers 140 to identify and collect information about the multimedia content 105 that is available for delivery over the Internet 130 to the client device 120 for playback on the media player 121. In one embodiment, the crawlers 112A-M collect the information about the multimedia content 105 from the servers 140 (e.g., web servers) hosting the multimedia websites 103, as depicted in FIG. 1. In other embodiments, the crawlers 112A-M collect the information about the multimedia content 105 from other types of servers, such as a server hosting an File Transfer Protocol (FTP) site, or the like. The servers 140 that host the multimedia websites 103 may be operated by different entities. For example, the multimedia website 103A may be owned and operated by a first content provider, and the multimedia website 103B may be owned rated by a second content provider. It should be noted that a single company or organization may have multiple entities that separately operate the multimedia websites. For example, a first network, owned by the single company, may have a multimedia website that is operated by a first entity, and a second network, owned by the same company, may have another multimedia website that is operated by a second entity. As such, a company may own multiple multimedia websites, but be operated by multiple entities. It should also be noted that although the embodiments herein describe the collection of information about the multimedia content 105 from the multimedia websites 103, the information about the multimedia content 105 is collected from one or more servers, such as the servers 140 that host the multimedia websites 103, servers that host the FTP site, or other types of servers, as would be appreciated by one of ordinary skill in the art.

Since the multimedia websites 103 may each include a different user interface, the multimedia content on each of the multimedia websites 103 is represented in different site-specific formats, and according to different nomenclatures. Nomenclature is a set or system of names or terms used by the particular website to describe the multimedia content 105. For example, one website 103 may use the term 'show,' to designate the multimedia content, while another site may use the term 'episode." The nomenclature of each website may also include unique identifiers for the multimedia content, terms for the network, the program, the series, the episode, or the like. The multimedia websites 103 may also represent the information in different formats. For example, the multimedia websites 103A may represent its multimedia content 150 in a catalog of content, which is stored in a single XML file, while multimedia website 103B represents its multimedia content 105 in a database, which can be queried to determine a list of available programs, a list of available episodes, and for each episode, details about that episode. Alternatively, the multimedia website 103A may store the information about the available multimedia content 105 according to the network, programs, and episodes. The information on various websites may be stored in different data structures, and may require different techniques to access the information. In one embodiment, each object (e.g., a network, a program, or an episode) may be represented in a single container that has key-value pairs. For example, the episode data for one multimedia website may have key-value pairs with one of the fields being having the key field, such as title, description, original air date, program and episode number, or the like, and the other value field containing the corresponding values. In another embodiment, the episode data is represented in a complex container, where the top-level container contains an episode identifier (ID) and children data containers partition the data by how is used on the particular multimedia website 103A. In another embodiment, information about the available multimedia content 105 is read resented in HTML, which may not have a particular data structure per se, but contains information regarding the network, the program, and episode. Although this detailed information may be intermingled in various ways.

The crawlers 112A-M are coupled to an index manger 114, operating on the server 110. The index manager 114 is coupled to data store 118. The index manager 114 receives the collected information from the crawlers 112A-M, and stores the collected information in an index 120 stored in the data store 118. Before storing the collected information in the index 120, the index manager 114 converts the different formats of the collected information into a common format, and converts the different nomenclatures into a common nomenclature to normalize the collected information to be stored in the index 120. The index 120 may be stored according to a common data structure. In one embodiment, the data store 118 is a database, such as a relational database. The database is a structured collection of records or data that is stored in a computer system. The structure is achieved by organizing the data according to a database model, such as the relational model, or alternatively, other types of models, such as the hierarchical model, the network model, or the like. The database (or other data stores) may have a database management system (DBMS) (not illustrated) that manages the index 120 in the database, as well as factors such as performance, concurrency, integrity, and recovery from hardware failures. Alternatively, the data store 118 may be other types of data stores, as would be appreciated by one of ordinary skill in the art.

In one embodiment, the crawlers 112 collect thumbnails of images of the multimedia content 105 and metadata describing the multimedia content 105. Thumbnails are reduced-size versions of an image, such as, for example, an image of a video frame of an episode, or an image of a logo for the program or network. In one embodiment, the metadata includes a title, a description, an original air date, and program and episode number(s). The metadata may also define an end user navigational environment for the multimedia content including, menus, thumbnails, sidebars, advertising, or the like. The metadata may also define functions such as fast forward, rewind, pause, and play that may be used with the multimedia content. Additionally, the metadata may be generated by the publisher or the entity managing the multimedia content through automated process(es) or manual definition.

Since the program and episode thumbnails may vary in size and aspect ratio, one basic part of normalization may be to convert the program and episode thumbnails to a common size and a common aspect ratio for uniformity in appearance in the user interface. In another embodiment, normalization may include field-name renaming. During field-name renaming, the metadata for a particular multimedia content may be renamed to a common nomenclature. For each multimedia content, the multimedia websites 103 may store information such as title, description, original air date, ratings (e.g., TV rating), season and episode numbers (if applicable), and a URL indicating a web address where the multimedia content is available for delivery over the Internet for playback on the media player 121. The titles may be represented as "displayName" on one multimedia website 103A, and "title" on another multimedia website 103B. Similarly, the content's unique identifier may be named "id" on one website 103A, and "external_id" on another. Also, the thumbnails may be labeled as "logo" on one website, or "thumbnail," "propoertyImageUrl," "imageUrl," "screenshot," or the like, on other websites 103. Also, the URLs to particular assets or resources, such as the URLs to thumbnails, or to the multimedia content itself, may be expressed in different formats for the different multimedia websites 103. For example, some multimedia websites may include absolute URLs, such as "http://www.xyz.com/images/logo.gif", and other websites include relative URLs, such as "/image/logo.gif/." Also, some multimedia websites may use their own unique identifier, while other multimedia websites may not use any identifiers. The normalization logic 206 may generate a unique identifier for each multimedia content, by renaming the unique identifier assigned by the multimedia website, or by adding the unique identifier to the information about the multimedia content that was not previously assigned a unique identifier. In other embodiments, because the unique identifier assigned by a multimedia website may be needed to access the multimedia content, the unique identifier is included in the normalized information.

The index manager 114 may convert the information from these different nomenclatures into a common nomenclature, so that the metadata for the available multimedia content is represented uniformly in the common data structure. The metadata may also include additional information about the multimedia content, such as a start index, an end index, whether the content is live, proprietary publisher data, encryption level, content duration, frame size, audio channel information, codecs used to encode the video and/or audio, width and height of the image, video bit rate (i.e., rate at which the video is encoded), audio bit rate, audio sample rate (i.e., rate at which the audio is sampled when captured), number of audio tracks (e.g., mono, stereo, or the like), frame rate (e.g., frames per second), staging size, or the like.

In one embodiment, one multimedia website 103 may store the 'show' name (e.g., episode name) lower case letters. As part of the normalization the index manager 114 corrects the show name to have the expected capitalization. Also, as part of the normalization, the index manager 114 may determine that the 'show' name is represented on that particular website as 'shows,' and subsequently rename the data to be represented as 'episodes' in the common data structure, or vice versa. For another example, the dates of the original air dates may vary from website to website, such as "29 Jan. 1985," "Jan. 29, 1985," "Jan. 29, 1985," or the like, and the index manager 114 may convert the dates to a common format. Other renaming techniques may be used to convert the collected information of different nomenclatures into normalized information having a common nomenclature. Also, other normalization techniques may be used to convert the collected information of different formats into normalized information having a common format.

Once the index manager 114 has normalized the collected information, the index manager 114 updates the index 120 with the normalized information. It should be noted that although the normalization occurs before the index 120 is updated, in another embodiment the collected information may be updated in the index 120, and then subsequently normalized. If there is no index present in the data store 118, the index manager 114 creates the index 120 with the normalized or non-normalized information.

The index manager 114 sends a data feed 103 over the network connection 102 to the client device 120 to populate the user interface on the client device 120 with the normalized information of the index 120. The data feed 103 is a mechanism for data users to receive updated data from the index 120. The data feed 103 may be considered a web feed. The data feed 103 may be modified according to specified criteria in the requesting client device 120, as described herein. The user interface allows the user to navigate and select the multimedia content 105 that is available for delivery over the Internet 130 for playback on the media player 121 operating on the client device 120. It should be noted that although both the crawlers 112A-M and the index manager 114 use the same network connection 102, in other embodiments, separate network connections may be used to access the Internet 130. Similarly, the multimedia content 105 and the data feed 103 may be received by the client device 120 over multiple network connections, instead of just the network connection 104.

The media player 121 includes a user interface manager 122 to receive the data feed 103 from the index manager 114. The user interface manager 122 may also request specific information about the normalized information stored in the index 120 to be sent in the data feed 103. The user interface manager 122 generates the user interface and populates the user interface with data from the received data feed 103. The user interface manager 122 outputs the user interface to the user interface display 126. The user interface allows the user to navigate and select a multimedia content that is available for delivery over the Internet 130 for playback on the media player 121, operating on the client device 120, without requiring the user and to input a URL to one of the multiple multimedia websites 103. The user interface manager 122 operates to hide the URLs from the user, allowing the user to navigate and select the available multimedia content without typing in URLs to the locations that delivery the available multimedia content. In one embodiment, the user may locate desired content and launch a stream or download in a single click without having to type in a single URL. In other embodiment, the user may locate desired content and launch a stream or download in more than a single click, such as, for example, a first click to select a program, and a second click to select an episode. This may allow a user to navigate and select the multimedia content without being at the computer (e.g., for a better 'living-room' viewing experience), such as by using a remote control input device to navigate and select the desired multimedia content.

When the user selects which multimedia content to play, the user interface manager 122 requests, from the particular multimedia website 103A, the webpage (e.g., using the URL) that plays the multimedia content 105 that corresponds to the selected content.

The media player 121 also includes an input interface 124 to receive data from one or more input devices 150 to allow a user to navigate and select the multimedia content 105 that is available for delivery over the Internet 130 playback of the media player 121 operating on the client device 120. The input devices 150 may be a remote control device 151, a mouse 152, a keyboard 153, or other input devices, such as a phone keypad, a touchpad, or the like. In one embodiment, the remote control device 151 is a TV remote control. In another embodiment, the remote control device 151 is a game controller, such as the Nintendo Wii controller, or the XBOX controller, available from Microsoft Corporation, or the like. Alternatively, the remote control device 151 may be other controllers, such as the Apple remote, or other remote controllers as would be appreciated by those of ordinary skill in the art. In one embodiment, the input interface 124 receives data from one of the input devices 150 in a first format that is specific to the particular input device, and converts the first format to a second format that is specific to one of a plurality of multimedia websites for the multimedia content. For example, during playback of a video, the input interface 124 may receive a signal or command from the remote control 151 to present the video in fullscreen on the website 103A, and the input interface 124 converts the signal or command into a command to have the user interface manager 122 call a function in that page (as designed by the multimedia website 103A), or into a command that is sent by the user interface manager 122, including a virtual key press (e.g., the 'F' key to go to fullscreen) (as designed by the multimedia website 103B to respond to that key press as input). In one embodiment, the user interface manager 122 calls a Javascript function. Alternatively, other functions of other languages may be used, depending on the language used by the particular website. Alternatively, the command sent by the user interface manager 122 may include other commands, such as cursor movements and cursor selection to simulate the cursor moving over a button on the screen and clicking the button, or the like. It should be noted that although the input interface 124 and the user interface manager 122 are illustrated as separate blocks, in other embodiments, the input interface 124 is part of the user interface manager 122. It should also be noted that in other embodiments, the user interface manager 122, input interface 14, and the user interface display 126 may be implemented outside of the media player 121 as a separate block. This separate block may interact with the media player 121 when the user selects the content. Alternatively, this separate block may interact with a web browser application that includes the media player 121.

In one embodiment, the user interface manager 122 manages the page that displays the multimedia content. The user interface manager 122 may have pre-defined actions for ways in which consumers of the data might want to interact with the webpages, so that the user does not have to know exactly how to interact with each user interface of the multimedia websites 103. Instead of the user manually extracting and recording the information needed to perform some type of interaction, the pre-defined actions may be implemented in the input interface 124 to convert the requested action from the input devices 150 to the command that is sent from the user interface manager 122 to the particular website to request the action. For example, a pre-defined action of "go fullscreen" may be defined generically to allow for the storage and use of the command without having all parts of the program understanding the site-specific details of how the action works for each of the multimedia websites 103. When the user requests the "go fullscreen," the user interface manager 122 uses specific commands stored in connection with the particular website to perform the requested action on the particular websites, such as, for example, sending a virtual keypress, or calling a Javascript function in that page. In one embodiment, the site-specific commands may be collected by the crawlers 112 and sent to the user interface manager 122 to be stored for later use during playback. In another embodiment, the site-specific commands may be collected by an administrator, and updated in the user interface manager 122. The pre-defined actions, such as "go fullscreen" may make it easier to adapt to changes at the particular websites. For example, if a website changed their site so that to go to fullscreen, the user had to click on a button, instead of receive a keypress, such as the 'F' keypress, the record for that particular site would be updated to reflect the change, and possibly, the consuming application could be modified to be able to simulate the new form of input. However, since the pre-defined action of "go fullscreen" is used, the database tables, the code for managing the data, the code for transmitting data to consumers, etc. would all be unmodified due to the data normalization process that happens up front.

Figure 2:
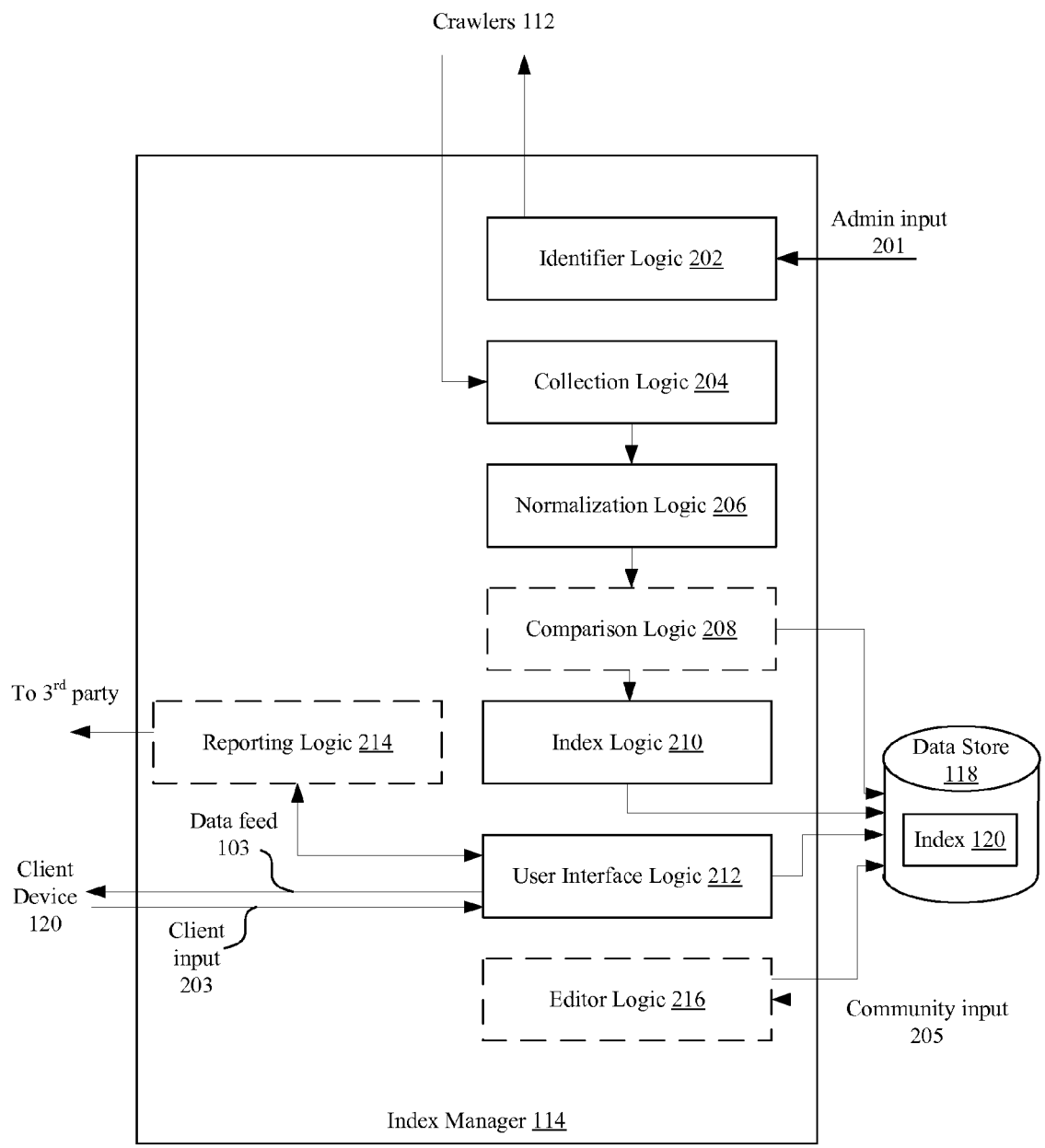
FIG. 2 is a schematic block diagram illustrating one embodiment of an index manager of a server for generating a data feed for the user interface with available multimedia content from multiple multimedia websites.

FIG. 2 is a schematic block diagram illustrating one embodiment of the index manager 114 of the server 110 of FIG. 1 for generating a data feed for the user interface with information about the available multimedia content 105 from the multiple multimedia websites 103. The index manager 114 includes identifier logic 202 coupled to the crawlers 112 to identify each of the multimedia websites to be crawled by each of the crawlers 112. Each of the crawlers 112 is configured to receive an initial URL of a different multimedia websites 103 from the identifier logic 202 to access that particular multimedia website 103 using the URL. At least one of the crawlers 112 may be configured to identify a link on the initial multimedia website to another URL having information regarding the multimedia content. The link may be used by the crawler 112 to access another webpage using the other URL, to identify information the other URL regarding multimedia content that is available for delivery over the Internet 130, and to retrieve the identified information to send to collection logic 204, described below. In another embodiment, the identifier logic 202 is configured to receive input from an administrator at a remove one or more multimedia website to be crawled by the crawlers 112. The identifier logic 202 may also be configured to receive input from the administrator to edit one or more of the initial URLs that are sent to the crawlers 112 to access the multimedia websites 103. The identifier logic 202 may also identify URLs to resources that describe the available multimedia content for a particular website, such as a content library or a content catalog.

The index manager 114 includes the collection logic 204 coupled to the crawlers 112 to receive the collected information from the crawlers 112. The collection logic 204 receives the information as represented in the different formats and according to the different nomenclatures of the various websites 103. The collection logic 204 outputs the collected information into the normalization logic 206. The normalization logic 206 converts the different formats of the collected information into a common format and converts the different nomenclatures into a common nomenclature. In one embodiment, the collected information includes a thumbnail of an image of the multimedia content, and metadata describing the multimedia content. The normalization logic 206, in this embodiment, is configured to resize the thumbnail to a common thumbnail size, if necessary, and to rename one or more values of the metadata into the common nomenclature. The normalization logic 206 may also be configured to reformat a site-specific structure of the metadata into a common data structure. In one embodiment, metadata includes a title, a description, an original air date, season and episode numbers (if applicable), and a URL indicating a web address or the multimedia content is available for delivery over the Internet for play back on the media player 121. Alternatively, the metadata may include other types of information that describe the multimedia content, such as genre, actors, copyright information, license information, keywords, a rating (e.g., TV rating, moving rating, or popularity rating), or the like.

In another embodiment, one of the multimedia websites 103 contains a content catalog including information regarding the available multimedia content, and the normalization logic 206 is configured to parse the content catalog to extract the information regarding the multimedia content that is available for delivery over the Internet. In this embodiment, the content catalog may include information regarding the locations of where the available content is available, even if the location is at another multimedia website. In another embodiment, one of the multimedia websites 103 contains a content library that contains the information regarding the available multimedia content for the particular websites.

In one embodiment, the normalization logic 206 outputs the normalized information to comparison logic 208. The comparison logic 208 compares the collected information (e.g., normalized information) against previously collected information, if any, stored in the index 120. In another embodiment, the comparison logic 208 receives the collected information from the collection logic 204 and performs the comparison before the normalization process performed by normalization block 206. In one embodiment, the comparison is done on a website by website basis after the normalization. In another embodiment, the comparison is done after all information has been collected. Alternatively, the comparison may be done in other ways as would be appreciated by one of ordinary skill in the art, such as, for example, as the information is collected or as the information is normalized. In another embodiment, the comparison logic 208 is optional, and no comparison is performed. This may increase the size of the index 120 and may not ensure that the index 120 has accurate information, since the index may not be updated with the most recent information from the multimedia websites 103. However, the index 120 may be updated manually when the multimedia content is no longer available on the particular website, or when the multimedia websites is no longer available.

Regardless of whether the comparison is done before or after the normalization process, the comparison logic 208 compares the collected information against previously collected information to determine if the information has been updated, or to determine if there is no multimedia content available for the index 120. The update logic 210 updates the index 120 accordingly with the normalized information. If the collected information is the same information as the previously collected information, the index logic 120 does not update the index 120. However, if the collected information is different, or does not exist in the index 120, the index logic updates the index 120 accordingly with the normalized information. The collection logic 204, normalization logic, comparison logic 208, and the update logic 210 may perform their respective functions as information is collected. In one embodiment, the crawlers 112 may be programmed to continuously crawl the identified multimedia websites 103. In another embodiment, the crawlers 112 are programmed to periodically crawl the identified multimedia websites 103, once every specified time period, such as each hour, each day, each week, or the like. As would be appreciated by one of ordinary skill in the art, the more frequent the crawlers 112 crawl the identified multimedia websites 103, the more current the index 120 will be; however, if the frequency is too high, there may not be many changes to update in the index 120. In one embodiment, the crawlers 112 are programmed to crawl the identified websites 103 to update the index 120 once a day. Alternatively, other rates may be specified.

Using the normalized information of the index 120, user interface logic 212 generates a data feed 103 to send to the client device 120 to populate the user interface on the client device 120. In one embodiment, the user interface logic 212 can send the data feed 103 to populate the user interface on the client device 120 in response to a request from the client device 120. In another embodiment, the user interface logic 212 can push updates to the client device 120 on the data feed 103 when new content is available for delivery over the Internet 130. The user interface allows the user to navigate and select the multimedia content that is available for delivery over the Internet 130 for playback on the media player 121. The user interface, which is displayed on the user interface display 126, may allow the user to navigate and select the multimedia content without requiring the user to input the URL to the multimedia website 103 that is to deliver the multimedia content.

In another embodiment, the user interface logic 212 receives client input 203 from the client device 120. The client input 203 may be used by the user interface logic 212 in generating the data feed 103. For example, the client input 203 may specify that the user wishes to see all available multimedia content from only specified content owners, or only new episodes of a specified program, multimedia content having a specified genre, title, actor, location, or keyword, or the like. The client input 203 allows the user to modify the EPG provided as the user interface. So, instead of being limited to available content by networks, programs, and episodes, such as in a provider-centric EPG, the user may modify the EPG to be a rating-based EPG where the EPG displays on the available multimedia content that exceeds a specified rating (whether the rating be popularity rating or a TV or movie rating (e.g., G, PG, PG-13, R, or the like). Similarly, the user may modify the EPG to be a show-centric EPG, where the EPG displays the available episodes of a particular program (e.g., show). The user may also modify the EPG to be a history-based EPG that displays the available multimedia content based on the viewing history of the particular user. The user may also modify the EPG to be a user-specified EPG, where the EPG displays the available multimedia content according to user-specified criteria of a viewing profile. The viewing profile may identify some information about the user for demographic information, such as age and gender, favorite genre, favorite programs, favorite networks, or the like. The client input 203 may also specify a playlist or queue of the particular user, and the EPG may be generated based on the types of items in the playlist or queue of the particular user. The client input 203 may also be used to set criteria for filtering the available multimedia content to be included in the EPG. In one embodiment, the filter designates one or more of the following filtering criteria, as specified by the client input 203: a content provider, a title, a search term, a rating, a program, an episode, a genre, most viewed, most popular, most viewed per one or more specified demographic criteria, most popular per one or more specified demographic criteria, or the like. The client input 203 may also be used to set reminders, to set recordings, to create customized lineups (e.g., such as a playlist or a subscription queue) to locate desired content within the EPG. Using the normalized information, the user interface logic 212 by way of the data feed 103 to the user interface, allows a user to quickly find a pre-populated EPG. Much like watching television where the user selects "guide" or "menu" to see an EPG, and the user's action (e.g., selecting one of the channels to watch), changes the channel to view the desired content, the user can view the EPG with the normalized information, select the desired content, and subsequently, the content is delivered from the particular website that delivers the particular multimedia content over the Internet 130 for playback on the media player 121. The user may select the content with the mouse or keyboard, but may also select the content using other types of input devices 150, such as a remote control device.

In another embodiment, the index manager 114 includes reporting logic 214 that is coupled to the user interface logic 212. The reporting logic 214 monitors activity by the user on the media player 121, and generates statistical information about the monitored activity for reporting. In one embodiment, the reporting logic 214 monitors navigation and viewing habits of the user. The reporting logic 214 may include a recommendation engine (not illustrated) that provides one or more recommendations to the user interface logic 212 to be included in the user interface (e.g., distributed EPG). The recommendations may include other multimedia content the user may wish to watch based on the multimedia content the user has selected most frequently, recommendations for types of advertising to be included for the particular user, such as based on the user's demographic information, such as age and gender, or the like. The reporting logic 214 may also detect when the user begins at the publisher site, or referred to by a referral website. The reporting logic may also output the statistical information about the monitored activity to a third party, such as marketing or advertising companies.

In another embodiment, the index manager 114 includes editor logic 216 that is coupled to the data store 118 to access the index 120. The editor logic 216 is configured to receive community input 205 to modify one or more entries in the index 120, and to access the index 120 to modify the one or more entries based on the received input. In one embodiment, the community input 205 is user input received from a user in a community. The index 120 may be designated as a public index, a private index, or both. The private index may limit access to the authorized users or to a specified community, whereas a public index would be open to the public generally. The editor logic 216 allows for human feedback for verifying, correcting, and maintaining accurate information about the available multimedia format in the index 120. In another embodiment, the community input 205 is from an administrator having access to a private index 120. In this embodiment, access may be limited to a specified user, or group of users, to modify entries of multimedia content that is available from their website, denying access to the general public. For example, a website may have a designated person that can verify the validity and accuracy of the entries corresponding to the available multimedia content that is available from the particular website. Alternatively, the community input 205 may be from an administrator of the index 120.

Figure 3:
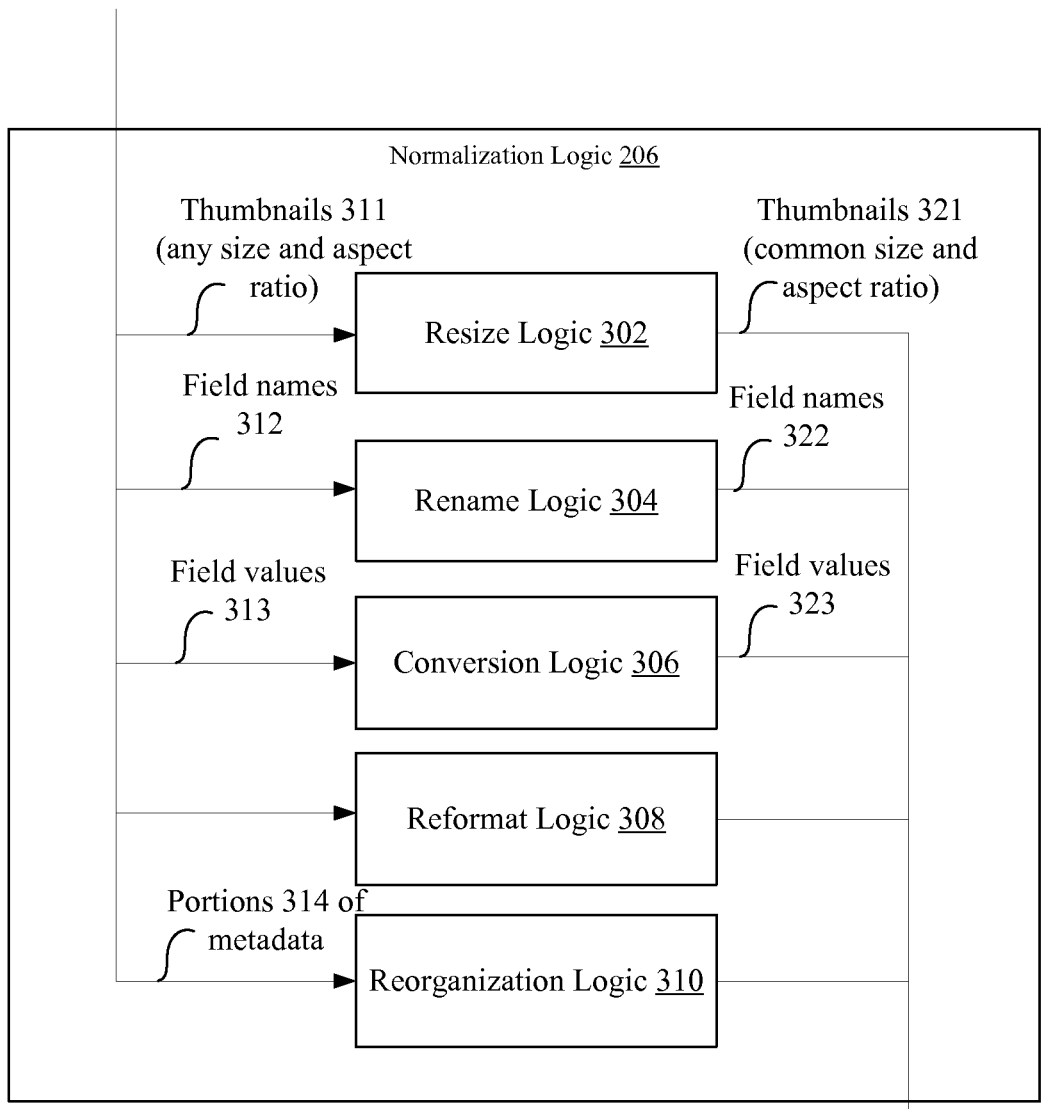
FIG. 3 is a schematic block diagram illustrating one embodiment of the normalization logic of FIG. 2.

FIG. 3 is a schematic block diagram illustrating one embodiment of the normalization logic 206 of FIG. 2. The normalization block 206 includes resize logic 302, rename logic 304, conversion logic 306, reformat logic 308, and reorganization logic 310. In the depicted embodiment, the normalization logic 206 receives the collected information from the collection logic 204 in the form of metadata 310. In one embodiment, the metadata 310 may include thumbnails 311, such as, for example, thumbnails of the networks, programs, and episodes. The resize logic 302 is coupled to receive the thumbnails 311. Since the thumbnails 311 may be any size and any aspect ratio, the resize logic 302 is configured to resize the thumbnails 311 to a common thumbnail size to become the thumbnails 321 of the normalized information 320. The metadata 310 may be formatted in a site-specific data structure and may have site-specific nomenclature. The metadata 310 may also include key-value pairs, each key-value pair including a field name and a corresponding field value. In one embodiment, the rename logic 304 is coupled to receive the field names 312 of the metadata 310, and is configured to rename one or more field names 312 into field names 322 according to a common nomenclature. The conversion logic 304 is coupled to receive the field values 313 of the metadata 310, and is configured to convert one or more of the values 313 into the field values 323 according to the common nomenclature. In another embodiment, the reformat logic 308 is coupled to receive the metadata 312 and to reformat the site-specific data structure of the metadata 310 into a common data structure. In one embodiment, the metadata 310 is stored in multiple locations on at least one of the multimedia websites 103. The reorganization logic 310 is coupled to extract portions 314 of the metadata 310 from the different locations, and reorganize the portions 314 into a common data structure. The normalization logic 206 outputs the normalized information 320 having the common nomenclature and the common data structure. It should be noted that although normalization logic 206 includes the resize logic 302, the rename logic 304, the conversion logic 306, the reformat logic 308, and the reorganization logic 310, in some embodiments, the metadata 310 may not need to be resized, renamed, converted, reformatted, or reorganized. In some embodiments, the normalization logic 206 may include other normalization logic to perform other functions to normalize the data of the different multimedia websites to normalized information to be stored in the index. It should also be noted that the logic blocks 302-310 may be performed in any order.

In one embodiment, the normalization logic 206 normalizes the collected information on a website by website basis. In another embodiment, the normalization logic 206 normalizes the collected information as it is received from the collection logic 204, which passes the collected information as it is received. Alternatively, the normalization logic 206 may normalize the collected information in other manners.

The user interface may be a GUI that includes thumbnails for each of the networks, each of the programs, and each of the episodes (or other designations), and the user can select one of the episode thumbnails to select the multimedia content for playback. In one embodiment, the GUI can be a desktop application on a personal computer, or as an application on a handheld device, such as a portable data assistant, smart phone, or other types of computing devices having a network connection to connect to the Internet. In another embodiment, the user interface is a GUI widget that can be used on the user's desktop, or as a GUI widget on a home page or a profile page of social networking websites. Once the user has selected the desired multimedia content on the GUI widget, the GUI widget may launch the default, or otherwise specified, web browser application to open the URL associated with the episode thumbnail to playback the requested multimedia content. The GUI widget remains active as a separate application, or as an overlay on the web browser application to allow a user to switch to other available multimedia content. In one embodiment, upon launching the web browser application to a particular content provider's website, the GUI widget may modify the theme or skin of a customizable GUI to include the brand of the particular content provider, for example, once the stream is launched and the frame video appears in the viewing display of the media player 121. The GUI widget may also be configured to launch the requested content in fullscreen mode, possibly hiding the web browser frame that includes the web address frame. The GUI widget may hide the URL of the streaming website in efforts to allow and encourage use of the input devices, such as the remote control device 151, for easy navigation of the available multimedia content. In another embodiment, the web browser frame and/or the web address frame may be shown, in response to a user action, such as clicking on a button in the fullscreen mode, or some other type of user action. This may also a sophisticated user to navigate to other websites by typing in a URL. In one embodiment, the GUI widget can be configured to be published into social networks, such as an application in the Facebook platform, or as other social network widgets. The GUI widget may also be configured to showcase, or otherwise promote other multimedia content that is available for delivery from the same multimedia website as the currently playing content, or from different multimedia websites. The GUI widget may also showcase user or community statistics about the currently playing content, such as the most popular shows, the total hours viewed today, or the like.

In other embodiments, the server-side process may provide a simple method to create a distributed electronic program guide (EPG) in the user interface display 126 on the client device 120. The EPG is an on-screen guide to the multimedia content that is available for delivery from the multiple multimedia websites. The user may navigate, select, and play the multimedia content using the EPG. The available multimedia content may be presented, sorted, and searched on the EPG according to time, title, channel, website, genre, or the like. The distributed EPG may be a show-centric EPG, a provider-specific EPG, a rating-based EPG, a history-based EPG or, a user-specified EPG, or the like. Alternatively, the guide may be implemented as an Interactive Program Guide (IPG) or an Electronic Service Guide (ESG), or the like. The EPG may be controlled by various types of input devices, such as a mouse, a keyboard, a phone keypad, a remote control, or the like. For example, the distributed EPG may be controlled by a remote control device to mimic functionality of a conventional TV remote control, such as channel surfing, program searching, program scheduling, program promotion, reminders, or the like. The distributed EPG may provide the functionality, while hiding the URLs to the particular websites delivery the content from the viewers. In one embodiment, the distributed EPG includes a playlist or a queue for the user, which indicate a list of multimedia content the user has selected to play. The distributed EPG may also allow the user to subscribe to a particular network, program, or the like to automatically include in the user's queue newly available multimedia content for the particular subscription. Also, the server-side process may notify the user of newly available content, for example, by sending an email to the user.

Figure 4A:
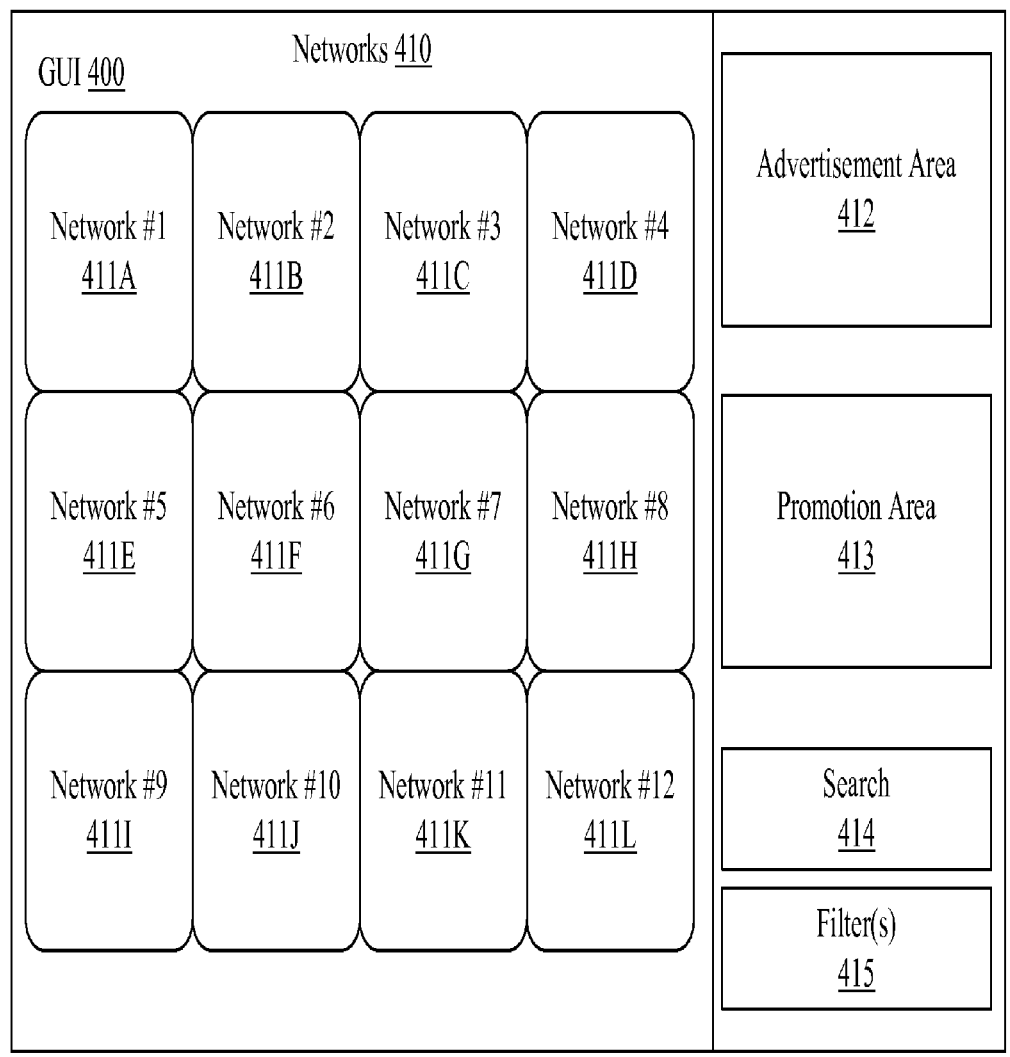
FIG. 4A illustrates the user interface display of FIG. 1 having a graphical user interface (GUI) of available networks having the available multimedia content from multiple multimedia websites, in accordance with one embodiment.

FIG. 4A illustrates the user interface display 126 of FIG. 1 having a GUI 400 of available networks 410 having the available multimedia content 105 from the multiple multimedia websites 103, in accordance with one embodiment. As described herein, the user interface manager 122 receives the data feed 103 to populate the user interface on the user interface display 126. In this embodiment, the user interface display 126 includes the GUI 400, which illustrates the available networks 410. In the depicted embodiment, the GUI 400 illustrates twelve thumbnails representative of the available networks 411A-411L; however, in other embodiments, more or less than twelve networks may be available. Each of the twelve thumbnails for the networks has been collected by the crawlers 112. For example, the thumbnail of network #1 411A may be the network #1 logo, and the thumbnail of network #2 411B may be the network #2 logo. Alternatively, other thumbnails may be used for the networks 411A-411L. The user interface allows the user to select one of the thumbnails in order to select the desired network. The user interface display 126 may also include other items in the display as either part of the GUI 400 or in addition to the GUI 400. In the depicted embodiment, the user interface display 126 includes advertisement area 412, promotion area 413, search area 414 and filter area 415. The advertisement area 412 may include text, images and/or video of advertisements. The advertisement area 412 may be generated in response to recommendations, generated by the reporting logic 214, which monitors the user's navigation and viewing habits on the media player 121. Alternatively, the advertisement area 412 may include advertisements that are not generated in response to the recommendations by the reporting logic 214. Similarly, the promotion area 413 may include text, images, and/or videos of other multimedia content that is available for delivery from one of the multimedia websites 103. The promotion area 413 may be used by a network, for example, to promote a show that is not doing well in the ratings, to maintain or build viewership of a program, or the like. The search area 414 may be used by the user to input one or more keywords or phrases to search for multimedia content based on the keywords or phrases. Also, the filter area 415 may be used to allow the user to filter the available multimedia content according to filtering criteria, such as a content provider, a title, a search term, a rating, a program, an episode, a genre, most viewed, most popular, most viewed per one or more specified demographic criteria, most popular per one or more specified demographic criteria, or the like.

It should be noted that the embodiments described herein may be used to promote networks, programs, and/or episodes in other ways than just using the promotional area 413. For example, a network could pay to show up on the default screen when you load the application. Also, in other embodiments, the organization of the user interface, such as the ordering of networks, programs, and/or episodes, could be dependent upon a user's list of favorite networks, programs, or episodes, for example (e.g., show the favorites first). In other embodiments, external factors may be used to promote networks or programs. For example, a particular network may be displayed first when the application has been downloaded from the multimedia website corresponding to the particular network. In these embodiments, although the application works for other websites, this particular network is able to promote their network, programs, or the like, since the user downloaded the application from their website.

The following figure assumes that the user has selected the first thumbnail of network #1 411A, although in other embodiments, the user may select other thumbnails in the GUI 400.

Figure 4B:
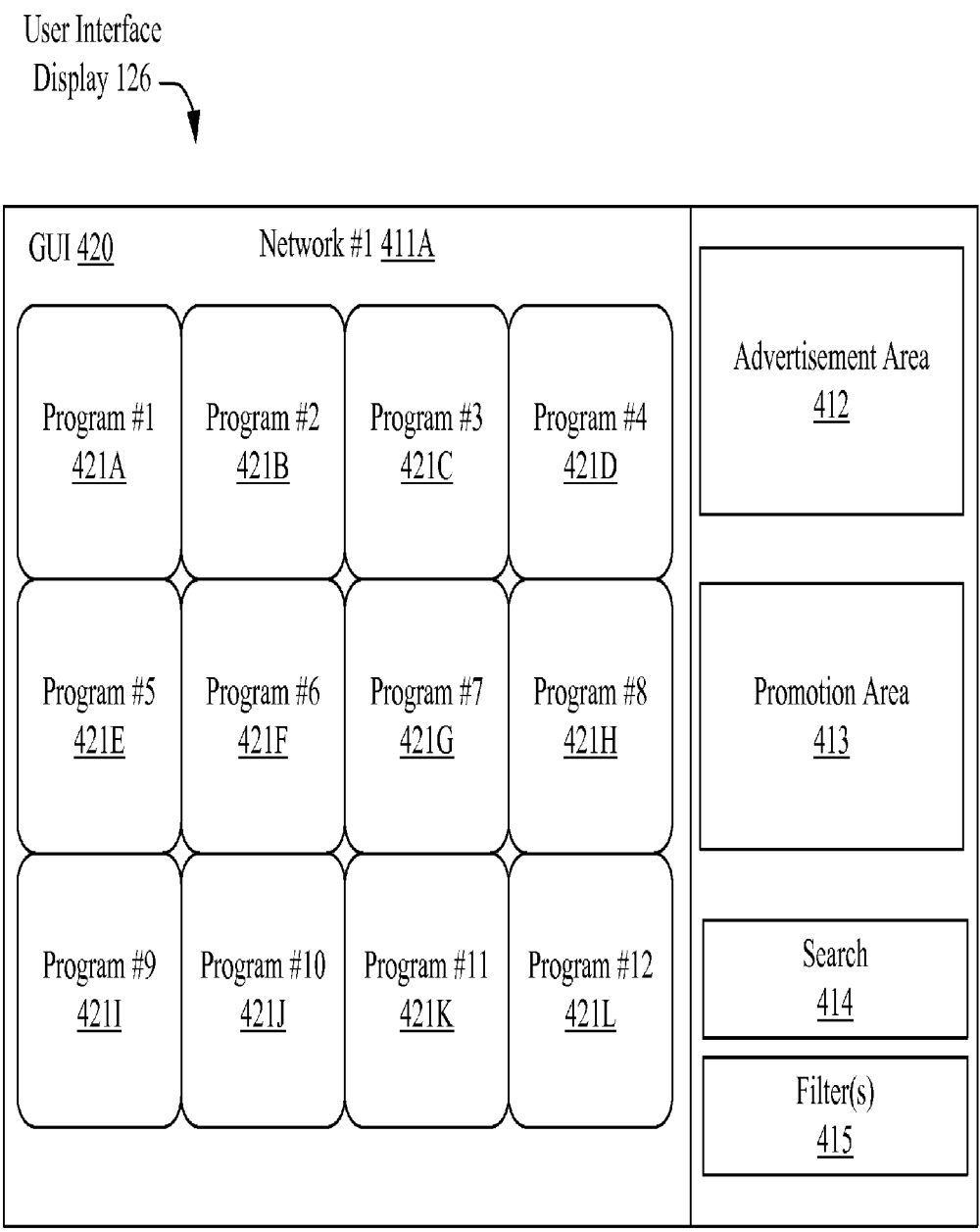
FIG. 4B illustrates the user interface display of FIG. 1 having a GUI of available programs of a first network of the available multimedia content multiple from the multimedia websites, in accordance with one embodiment.

FIG. 4B illustrates the user interface display of FIG. 1 having a GUI 420 of available programs of a first network 411A of the available multimedia content 105 from the multiple multimedia websites 103, in accordance with one embodiment. In this embodiment, the user interface display 126 includes the GUI 420, which illustrates the available programs of network #1 411A. In the depicted embodiment, the GUI 420 illustrates twelve thumbnails representative of the available programs 421A-421L; however, in other embodiments, more or less than twelve programs may be available. Each of the twelve thumbnails for the programs has been collected by the crawlers 112. For example, the thumbnail of program #1 421A may be an image of the program A, and the thumbnail of program #2 421B may be an image of the program B. Alternatively, other thumbnails may be used for the programs 421A-421L. The user interface allows the user to select one of the thumbnails in order to select the desired program. Like in FIG. 4A, the user interface display 126 may also include other items in the display as either part of the GUI 420 or in addition to the GUI 420, such as the advertisement area 412, promotion area 413, search area 414, and filter area 415. In one embodiment, the advertisement area 412 includes the advertisements from advertisers of the network #1 411A. Similarly, the promotion area 413 may include promotions to other multimedia content that is available from the network #1 411A. In other embodiments, the advertisement area 412 and promotion area 413 may include advertisements from other advertisers than those of the network #1 411A, and promotions for multimedia content that is available from other multimedia websites than the network #1 411A.

The following figure assumes that the user has selected the second thumbnail of program #2 421B, although in other embodiments, the user may select other thumbnails in the GUI 420.

Figure 4C:
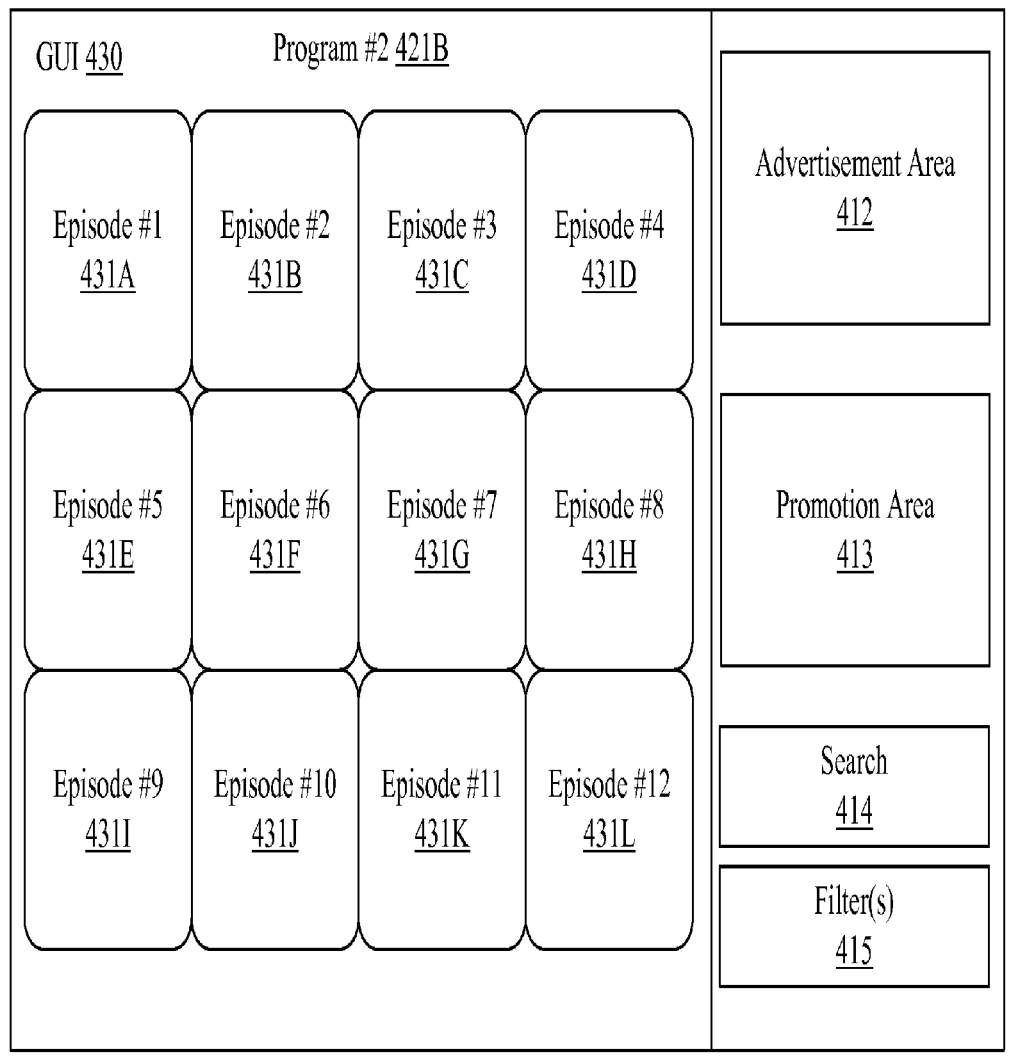
FIG. 4C illustrates the user interface display of FIG. 1 having a GUI of available episodes of a second program of the available multimedia content from multiple multimedia websites, in accordance with one embodiment.

FIG. 4C illustrates the user interface display of FIG. 1 having a GUI 430 of available episodes of a second program 421B of the available multimedia content 105 from the multiple multimedia websites 103, in accordance with one embodiment. In this embodiment, the user interface display 126 includes the GUI 430, which illustrates the available episodes of program #2 421B. In the depicted embodiment, the GUI 430 illustrates twelve thumbnails representative of the available episodes 431A-431L; however, in other embodiments, more or less than twelve episodes may be available. Each of the twelve thumbnails for the episodes has been collected by the crawlers 112. For example, the thumbnail of episode #1 431A may be an image of the episode A, and the thumbnail of episode #2 431B may be an image of the episode B. Alternatively, other thumbnails may be used for the episodes 431A-431L. The user interface allows the user to select one of the thumbnails in order to select the desired episode to playback on the media player 121. Like in FIGS. 4A and 4B, the user interface display 126 may also include other items in the display as either part of the GUI 430 or in addition to the GUI 430, such as the advertisement area 412, promotion area 413, search area 414, and filter area 415.

Once the user has selected one of the thumbnails representative of episodes 431A-431L, the media player 121 launches the web browser application and accesses the particular multimedia website 103 using the URL associated with the selected thumbnail. In one embodiment, the media player 121 launches the web browser application as a separate application. In another embodiment, the media player 121 embeds the web page in the viewing display of the media player 121. For example, in one embodiment, when a thumbnail is selected, the media player 121 launches the requested content in fullscreen mode, hiding the web browser frame that includes the web address frame for inputting the URL.

Figure 4D:
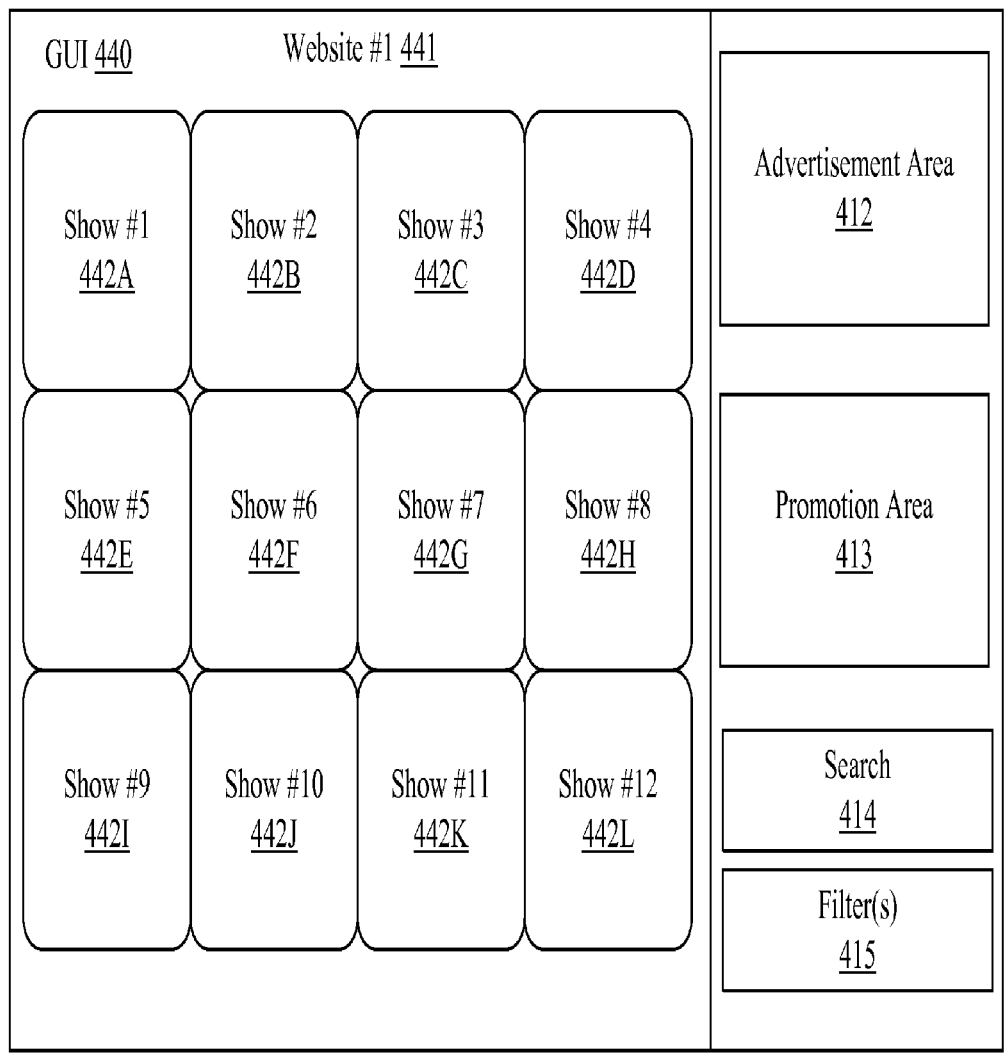
FIG. 4D illustrates the user interface display of FIG. 1 having a GUI of available episodes of a first multimedia website of the available multimedia content from multiple multimedia websites, in accordance with another embodiment.

It should be noted that FIGS. 4A-4C illustrate an organization of GUIs that flow from networks, to programs, to episodes. In other embodiments, the GUIs may be organized in other manners, such as by just programs and episodes, or just by episodes of a particular multimedia websites, as illustrated in FIG. 4D. For example, the GUI 420 of FIG. 4B or the GUI 430 of FIG. 4C may be the first GUI to be displayed, instead of the GUI 400. The organization of networks, programs, and episodes may be the predefined organization; however, other organization of the available multimedia content may be used. Also, the organization may also be customizable by the particular user.

FIG. 4D illustrates the user interface display of FIG. 1 having a GUI 440 of available episodes of a first multimedia website 441 of the available multimedia content 105 from the multiple multimedia websites 103, in accordance with another embodiment. In this embodiment, the user interface display 126 includes the GUI 440, which illustrates the available episodes of websites #1 441. In the depicted embodiment, the GUI 440 illustrates twelve thumbnails representative of the available episodes 442A-442L; however, in other embodiments, more or less than twelve episodes may be available. Each of the twelve thumbnails for the episodes has been collected by the crawlers 112. For example, the thumbnail of episode #1 442A may be an image of the episode A, and the thumbnail of episode #2 442B may be an image of the episode B. Alternatively, other thumbnails may be used for the episodes 442A-442L. The user interface allows the user to select one of the thumbnails in order to select the desired episode to playback on the media player 121. Like in FIGS. 4A-4C, the user interface display 126 may also include other items in the display as either part of the GUI 430 or in addition to the GUI 430, such as the advertisement area 412, promotion area 413, search area 414, and filter area 415.

Figure 5:
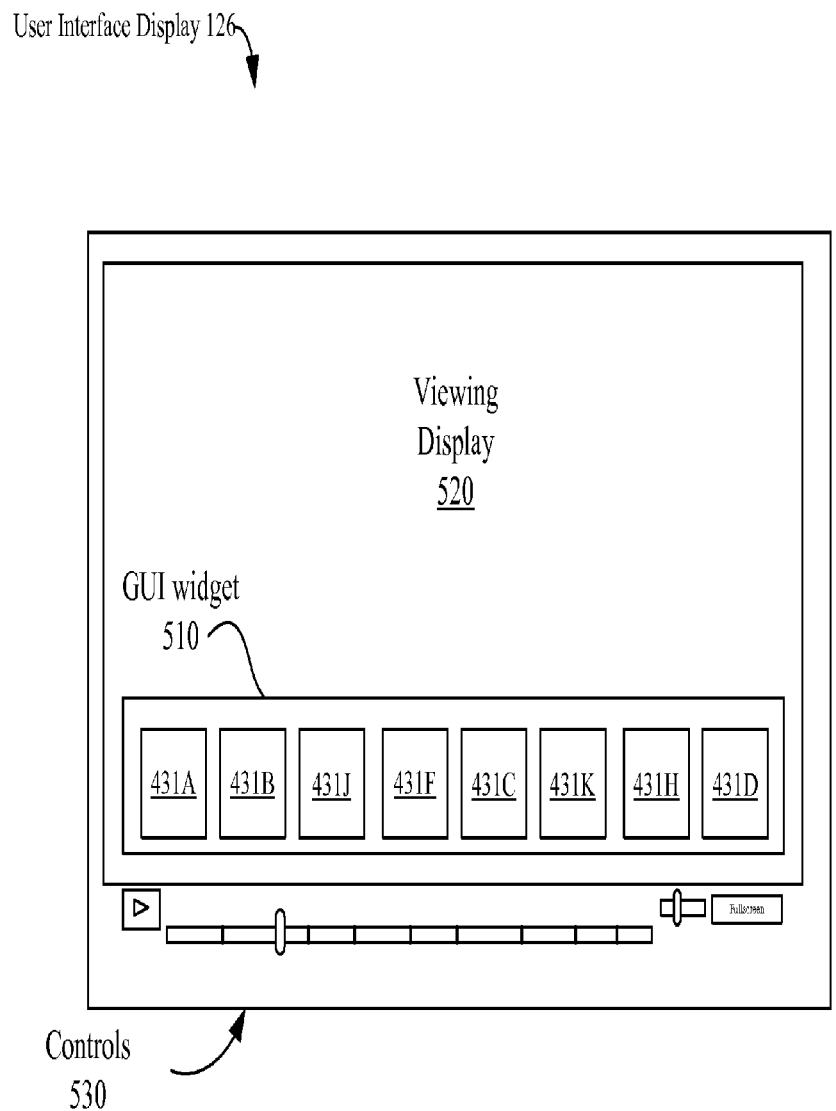
FIG. 5 illustrates the user interface display of FIG. 1 having a GUI widget as an overlay on a viewing display of a media player, in accordance with one embodiment.

FIG. 5 illustrates the user interface display of FIG. 1 having a GUI widget 510 as an overlay on a viewing display 520 of a media player, in accordance with one embodiment. In the depicted embodiment, the user interface generated by the user interface manager 122 is the GUI widget 510 that is an overlay on the viewing display 520. The viewing display 520 is configured to display the selected multimedia content (e.g., decoded and rendered video). The viewing display 520 may be resized according to preference, or in order to accommodate various forms of audio/video. The GUI widget 510 may include the available multimedia content. For example, as depicted in FIG. 5, the GUI widget 510 includes thumbnails representative of the available episodes 431A, B, C, D, F, H, J, and K of the program #2 421B of FIG. 4C. Alternatively, the GUI widget 510 may include thumbnails representative of the available networks, available programs, or both. Also, the GUI widget 510 may include thumbnails representative of the available episodes for the particular multimedia website of the currently playing content in the viewing display, as well as available episodes from other multimedia websites. In one embodiment, the GUI widget 510 is configured to be semi-transparent, allowing the viewer to see the portions of the multimedia content on the viewing display 520 under the GUI widget 510. The percentage of transparency may be customizable by the user. In another embodiment, the GUI widget 510 is configured to hide when inactive, such as, for example, after a specified period of time of inactivity of interaction with the GUI widget 510, or after the user has selected the multimedia content and the content appears in the viewing display 520. Alternatively, the GUI widget 510 may be customized to operate in other ways as would be appreciated by one of ordinary skill in the art.

The user interface 126 also includes controls 530 for receiving input from a user to control the playback of the selected multimedia content. The controls 530 may include buttons for controlling playback of the multimedia content. The buttons may include, but are not limited to, a play button, a pause button, a fast forward button, and a rewind button. The controls 530 may also include a timeline that is configured to represent the duration and current status of playback of the selected multimedia content. The timeline may be divided into different portions to indicate the portions of the multimedia content (e.g., portions within the same TV show), or to indicate different multimedia content (e.g., different TV shows). The timeline may include a status bar that can be 'dragged' to the right in order to fast forward through the multimedia content, and likewise to the left in order to rewind. The controls 530 may also include volume controls, as well as other additional functionality of the media player 121, such as such as adjusting the playback window to full-screen, mini-mode, a pop-out player window, additional playlist, or content navigation aids. Alternatively, more or less controls as depicted in FIG. 5 may be used in the controls 530. The controls 530 may also be configured to hide when inactive, such as after a specified period of time after the user interacts with the controls 530, or as soon as the action has been completed.

The FIG. 5 illustrates by way of example only, and one skilled in the art would appreciate that the user interface display 126 of the media player 121 may be implemented with many different styles and orientations according to the available functionality of the media player 200. Also, as described herein the user interface display 126 may be implemented as a widget of a web browser application.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

Figure 6:
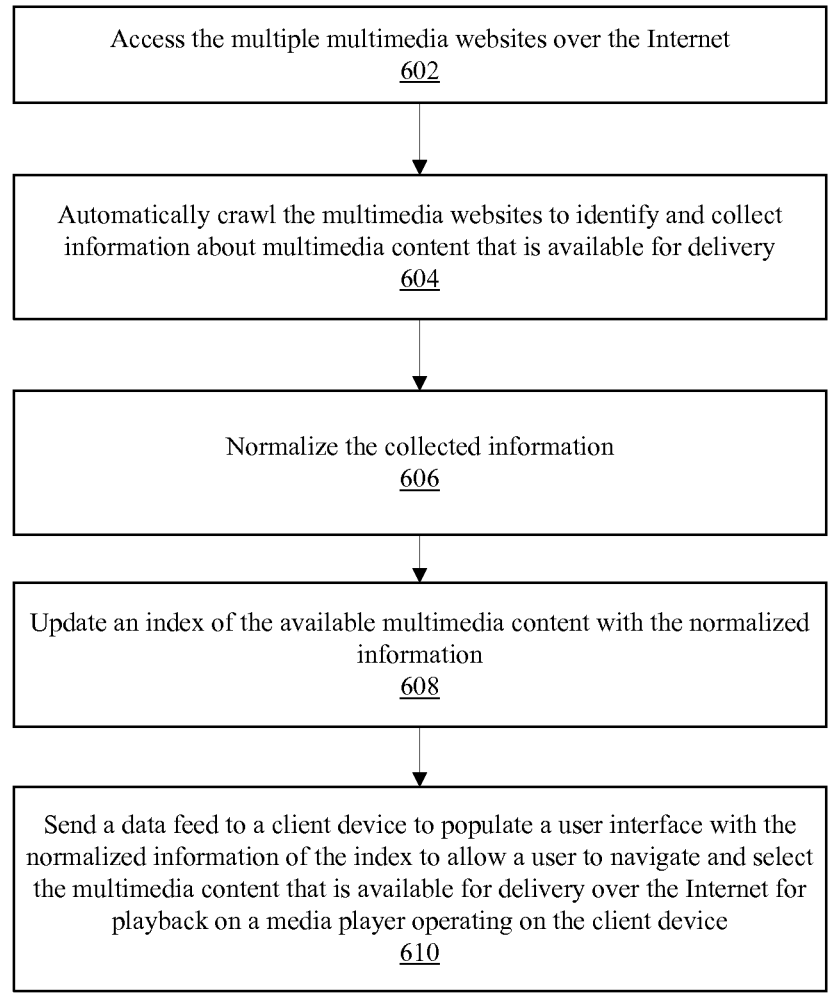
FIG. 6 is a flow diagram of one embodiment of a method for sending a data feed to a client device to populate a user interface with normalized information of the index to allow a user to navigate and select multimedia content is available for delivery over the Internet for playback on the media player operating on the client device.

FIG. 6 is a flow diagram of one embodiment of a method for sending a data feed to a client device to populate a user interface with normalized information of the index to allow a user to navigate and select multimedia content is available for delivery over the Internet for playback on the media player operating on the client device. The method 600 is performed by processing logic that may include hardware (circuitry, dedicated logic, or the like), software (such as is run on a general purpose computer system or a dedicated machine), or a combination of both. In one embodiment, method 600 is performed by the server 110.

Processing logic starts and accesses the multimedia websites 103 over the Internet 130 (block 602). The processing logic automatically crawls the multimedia websites 103 to identify and collect information about multimedia content that is available for delivery over the Internet 130 (block 604). The processing logic normalizes the collected information (block 606), and updates an index of the available multimedia content with the normalize information (block 608). In one embodiment, the processing logic resizes a thumbnail of an image of the multimedia content to a common thumbnail size, renames one or more values of metadata describing the multimedia content into the common nomenclature, and to reformat a site-specific data structure of the metadata into a common data structure. Alternatively, the processing logic can normalize the collected information in other ways, as described herein. Once the index has been updated, the processing logic then sends the data feed 103 to the client device 120 to populate a user interface with the normalized information of the index (block 610). The user interface allows a user to navigate and select the multimedia content that is available for delivery over the Internet 130 for playback on the media player 121, which is operating on the client device 120. The user interface may allow the user to navigate and select the multimedia content without requiring the user to input a URL to the multiple multimedia websites 103.

In another embodiment, the processing logic compares the collected information against previously collected information, if any, stored in the index. This may be done before or after the normalization at block 606. In another embodiment, the processing logic receives input from an administrator to add or remove one or more of the multimedia websites 103 to be crawled. In another embodiment, the processing logic receives input from the administrator to modify parameters of one or more of the multimedia websites 103 to be crawled, such as the initial URL to be crawled by one of the crawlers 112. In one embodiment, the processing logic accesses one of the multimedia websites 103 using an initial URL. While accessing a multimedia website 103, the processing logic identifies a link on the initial multimedia website coming information regarding available multimedia content. The processing logic accesses another multimedia website 103 using the other URL, identifies information at the other URL regarding multimedia content that is available for delivery over the Internet 130, and retrieves the identified information.

In another embodiment, the processing logic monitors a cavity by the user on the media player 121 and generates statistical information about to the monitored activity for reporting purposes as described herein. In another embodiment, the processing logic receives community input to modify an entry in the index 120, and subsequently modifies the entry based on the community input.

Figure 7:
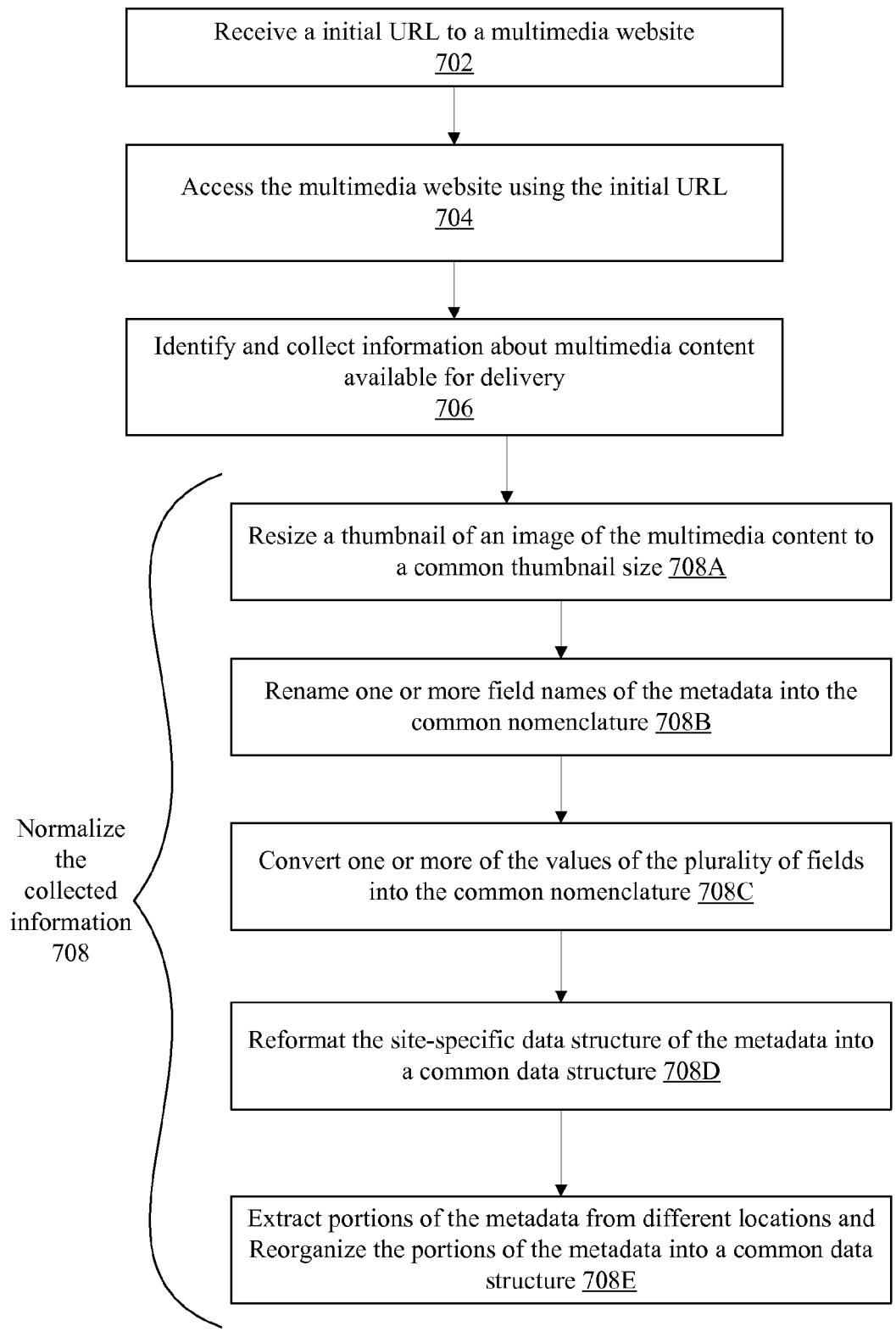
FIG. 7 is a flow diagram of one embodiment of the method for normalizing collected information from multiple multimedia websites.

FIG. 7 is a flow diagram of one embodiment of the method for normalizing collected information from multiple multimedia websites. The method 700 is performed by processing logic that may include hardware (circuitry, dedicated logic, or the like), software (such as is run on a general purpose computer system or a dedicated machine), or a combination of both. In one embodiment, method 700 is performed by the server 110.

Processing logic starts and receives an initial URL to a multimedia website (block 702). The URL may be received as input (e.g., 201) from an administrator. The processing logic accesses the multimedia websites 103 over the Internet 130 using the initial URL (block 704). While accessing the multimedia website 103, the processing logic identifies and collects information about multimedia content 105 that is available for delivery over the Internet 130 (block 706). The processing logic normalizes the collected information (708). In one embodiment, the collected information is metadata. The metadata may include thumbnails of any size and any aspect ratio, for example. The processing logic, as part of the normalization, resizes thumbnails to a common thumbnail size, including a common size and a common aspect ratio (block 708A), if necessary. Since the metadata may be formatted in a site-specific data structure and may have site-specific nomenclature, the processing logic rename one or more field names into field names according to a common nomenclature (block 708B), if necessary. The processing logic converts one or more of the values into the field values according to the common nomenclature (block 708C), if necessary. The processing logic reformats the site-specific data structure of the metadata into a common data structure (block 708D). The metadata may be stored in multiple locations on at least one of the multimedia websites 103. The processing logic extracts portions of the metadata from the different locations, and reorganizes the portions into a common data structure (block 708E). It should be noted that although the processing logic may be configured to perform all the operations at blocks 708A-E, in some embodiments, the processing logic may perform less than all of the operations, depending on the collected information from the particular website. It should also be noted that the blocks 708A-E may be performed in any order.

It should be noted that the processing logic has been configured to identify, collect, and normalized the information from a particular website according to processing rules that been established for that particular website. Since websites may differ in how the information is stored on the website, the processing rules may differ from website to website. In one embodiment, the administrator identifies a new website that has multimedia content for delivery over the Internet, and the administrator manually evaluates the new multimedia website to determine how the multimedia content can be accessed for delivery, and how the information about the multimedia content is stored, such as by determining the data structure used to represent the information about the multimedia content. The administrator then configures the processing logic to operate according to the processing rules that performs the operations to identify, collect, and normalize the information about the multimedia content that is available for delivery over the Internet from the new website. In another embodiment, once the administrator identifies the new website, such as by inputting the initial URL to be crawled, the processing logic can attempt to use the processing rules that have been established for other multimedia websites to identify, collect, and normalize the information about the multimedia content that is available for delivery by the new website. Alternatively, portions of the evaluation process may be performed manually, while other portions of the evaluation process may be automated.

In one embodiment, the information about the available multimedia content on a particular website is stored as data in an Extensible Markup Language (XML) format. For example, the XML file may include the following data to represent an episode of Jeopardy having an air date of Jun. 21, 2005:

```
<?xml version="1.0" encoding="ISO-8859-1"?> <program>
    <title>jeopardy!</title>
    <air_date>21 Jun 05</air_date>
</program>
```

In this example, the processing logic, as part of the normalization, parses the XML data, and stores a program record in the index 120 with 'Title'=Jeopardy! and the given 'Air date'=Jun. 21, 2005. The processing logic not only parses the data structure of the XML file to extract the values for the title and air_date fields, but also may rename the field names to 'Title' and 'Air date', as well as converting one or more of the fields, such as to capitalize 'Jeopardy!' or to convert the format of the date to "MM/DD/YYYY" format.

In another embodiment, the information about the available multimedia content on a particular website is stored as data in a JavaScript Object Notation (JSON) format. JSON is a text-based, human-readable format for representing simple data structures and associative arrays (sometimes called objects). For example, the same information as in the previous example may be represented by the following JSON data:

```
{
    'title' : 'Jeopardy!',
    'air_date' : '21 Jun 05'
}
```

In this example, the processing logic, as part of the normalization, parses the JSON data, and stores a program record in the index 120 with 'Title'=Jeopardy! and the given 'Air date'=Jun. 21, 2005. In another embodiment, the information about the available multimedia content on a particular website is stored as comma-separated values (CSV) format. For example, the same information as in the previous example may be represented by the following CSV data:

Program Name, Air Date, . . .
Jeopardy!, 21 Jun. 2005, . . .

In this example, the processing logic, as part of the normalization, parses the CSV data, and stores a program record in the index 120 with 'Title'=Jeopardy! and the given 'Air date'=Jun. 21, 2005. Alternatively, the information about the available multimedia content on a particular website may be stored in other data formats, as would be appreciated by one of ordinary skill in the art, such as text files, HTML files, or the like. It should be noted that the examples provided above are merely exemplary to show how the collected information may be reformatted from one data structure to another, but in other embodiments, other formats, other fields, other values may be normalized.

In another embodiment, the information about the available multimedia content on a particular website is converted to transform data values. For example, the following JSON data is converted from a string to a data object:

```
{
    "date" : "20080512",
    ...
}
```

In this example, the processing logic, as part of the normalization, converts or transforms the string of "20080512" of the JSON data into a data object with year=2008, month=May, and day=12. Also, the processing logic, based on the data context, knows that the date is actually the original air date of an episode, so the date field could be renamed to be stored in an episode record in the database with a name of 'air_date,' instead of 'date.' Other examples of renaming fields may include renaming the source data having 'name' to use 'title, 'show' to 'program,' 'screenshot' to 'thumbnail,' or the like.

In another example of data value transformation as part of the normalization, the information about the available multimedia content on a particular website may include the following XML data:

```
<?xml version="1.0" encoding="UTF-8"?>
<episode id="1234" season="4" number="3">
    <thumbnail width="100" height="32"
    url="/images/episodes/1234.png" /> </episode>
```

In this example, the processing logic may store the relative URL of the source data as an absolute URL, for example, http://data.foreignserver.com/images/episodes/1234.png. Based on the width and height, the processing logic may resize the image (e.g., thumbnail) and store the resized image on another server. In order to use the resized image, the processing logic may update the URL to be, for example, http://uremote.otherserver.com/images/cache/xyz/programA/1234.png. The processing logic may also convert the image to a common format, for example, to make it easier for client devices to consume. After such conversion, the URL stored in the index may be http://uremote.otherserver.com/images/cache/xyz/programA/1234.jpg.

In another example of reformatting the data structure as part of the normalization, the information about the available multimedia content on a particular website may be a 'flat' data structure (e.g., like in the .csv file) including the following data:

Program Name, Program Logo, Episode Season, Episode Number, Episode Logo, Episode Description . . .
Jeopardy!, . . .

In this example, the processing logic may store the program-related fields in a program table of the database, and then store the episode-related fields in an episode table in the database, having each entry use a foreign key to reference the correct program row. Another example of reformatting the data structure is shown in FIG. 8.

Figure 8:
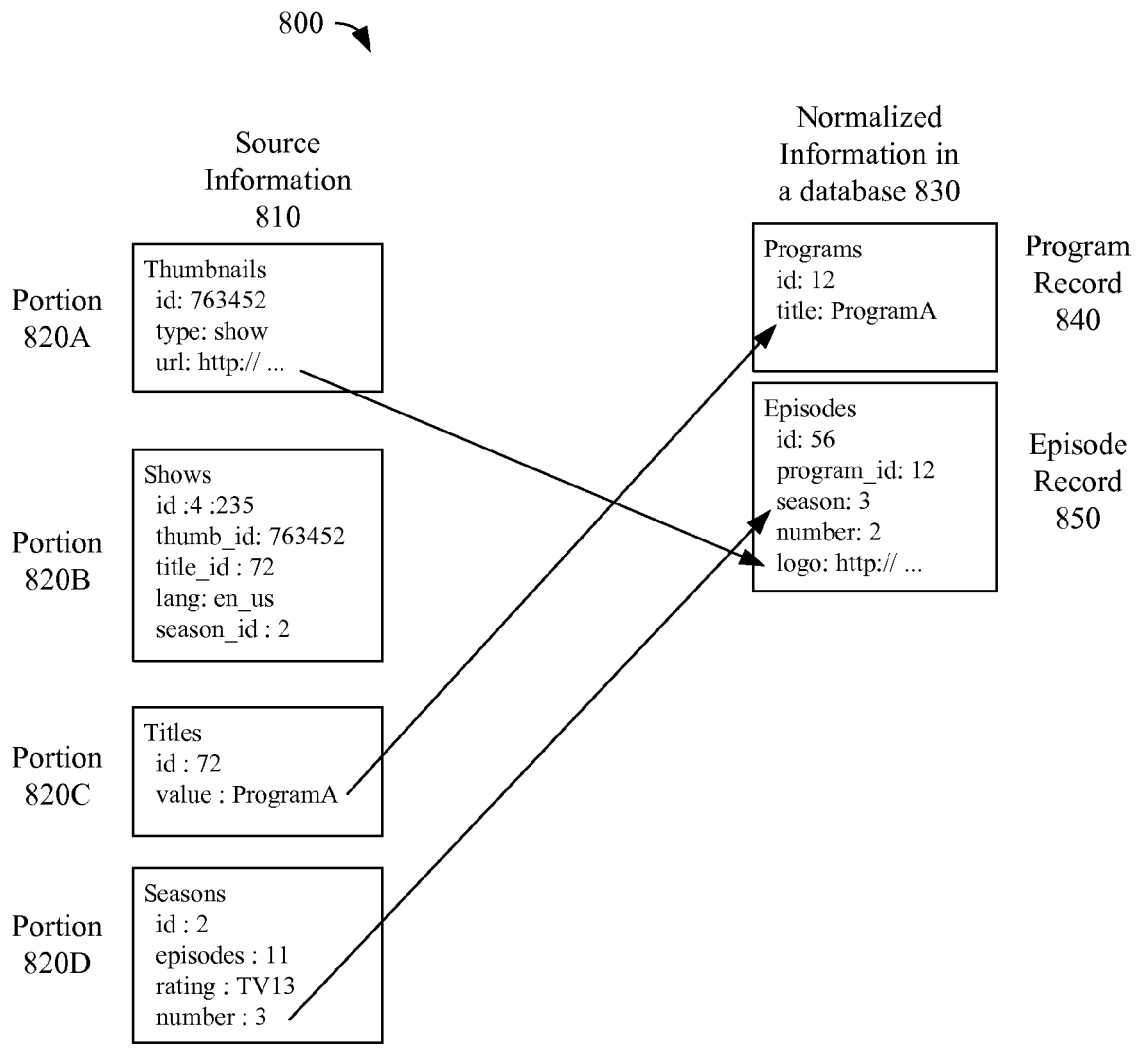
FIG. 8 illustrates a graphical representation of reorganizing the collected information, according to one embodiment.

FIG. 8 illustrates a graphical representation 800 of reorganizing the collected information, according to one embodiment. The source information 810 may include various portions 820 that are stored at the same location (e.g., in the same file) or different locations. In the depicted embodiment, the various locations may be separate tables of a database, including for example, a thumbnail table, a show table, a title table, and a season table. The processing logic can extract portions (e.g., 820A, 820C, and 820D), and can reorganize the portions into a common data structure. For example, the processing logic may extract the URL to the thumbnail in the portion 820A and store the URL in an episode record 850 of a database 830 (e.g., index 120 of the data store 118). The processing logic may extract the title 'ProgramA' in the portion 820C and store the title in a program record 840 of the database 830. The processing logic may extract the season number '3' from the portion 820D and store the season number in the episode record 850. Alternatively, other types of information may be extracted from the portions 820, and also other types of data stores may be used than databases for both the source information 810 and the normalized information.

Figure 9:
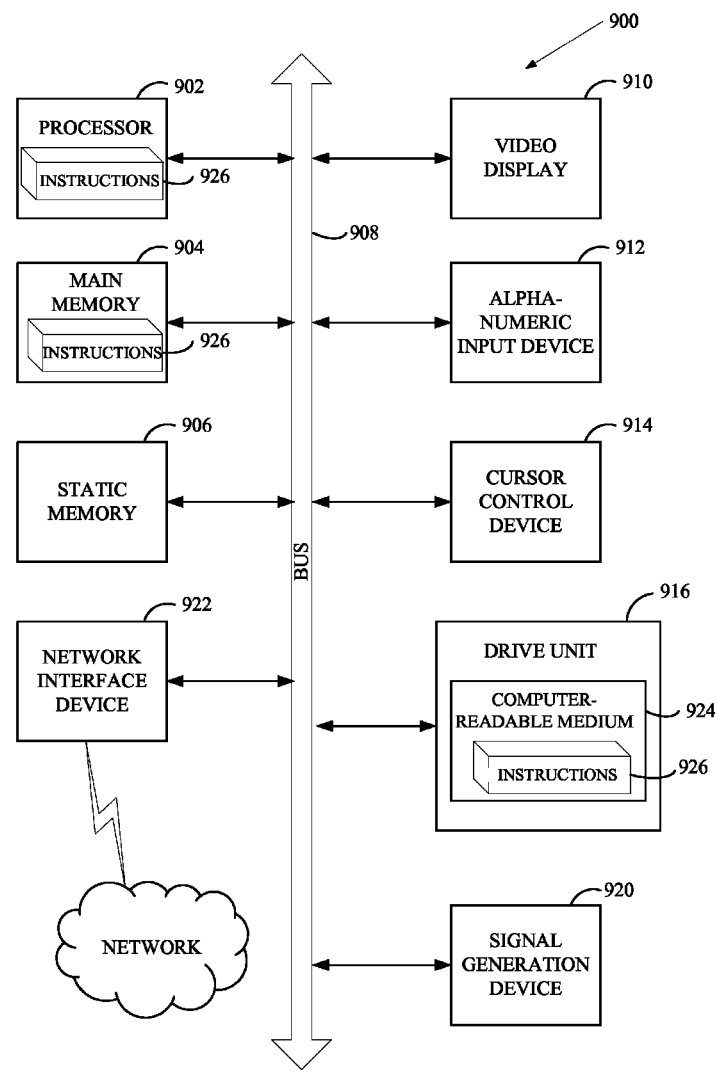
FIG. 9 illustrates a diagrammatic representation of a machine in the exemplary form of a computer system within which a set of instructions, for causing the machine to perform any one or more of the methodologies discussed herein, may be executed.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), EPROMs, EEPROMs, flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908.

While the machine-readable storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media, non-volatile memory (NVM), and the like.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A server for populating a user interface on a client device with multimedia content available by delivery from a plurality of other servers not associated with the server, comprising:
a processor, wherein the processor is configured to receive an indication of the multimedia content available by delivery from the plurality of other servers, wherein the multimedia content available by delivery from the plurality of other servers is displayed in a plurality of different display formats and has a plurality of different naming conventions for describing the content of the media content, wherein the processor is further configured to execute normalization logic to convert the plurality of different display formats into a common display format and to convert the plurality of different naming conventions describing the content of the media content into a common naming convention,
wherein the indication of the multimedia content available by delivery from the plurality of other servers comprises metadata describing the multimedia content, and wherein the normalization logic transforms the metadata into the normalized information, and the metadata comprises a plurality of fields, each having a value, and wherein the processor is further configured to execute normalization logic to:
rename one or more of the plurality of field names of the metadata based upon the common naming convention to transform the metadata; and
convert one or more of the values of the plurality of fields based upon the common naming convention to transform the metadata.

2. The server of claim 1, wherein the user interface allows the user to navigate and select the multimedia content that is available for delivery over the Internet for playback on the media player operating on the client device without requiring the user to input a Uniform Resource Locator (URL) to one of the plurality of other servers.

3. The server of claim 1, wherein the metadata comprises a title or a description, and a Uniform Resource Locator (URL) indicating a web address where the multimedia content is available for delivery over the Internet for playback on the media player.

4. The server of claim 1, wherein the metadata comprises a thumbnail of an image of the multimedia content, and wherein the processor is further configured to execute normalization logic to resize the thumbnail to a common thumbnail size to transform the metadata.

5. The server of claim 1, wherein the metadata is stored according to a site-specific data structure, and wherein the processor is further configured to execute normalization logic to reformat the site-specific data structure of the metadata into a common data structure.

6. The server of claim 1, wherein the metadata is stored in a plurality of locations on at least one of the plurality of other servers according to a site-specific data structure, and wherein the processor is further configured to execute normalization logic to extract parts of the metadata from different locations of the plurality of locations, and to reorganize the parts of the metadata into a common data structure.

7. A method for populating a user interface on a client device with available multimedia content from a plurality of servers, comprising:
collecting information on the available multimedia content from the plurality of servers, the available multimedia content from the plurality of servers having a plurality of different display formats and having a plurality of different naming conventions describing the content of the media content;
normalizing the collected information by converting the plurality of different display formats of the collected information into a common display format and converting the plurality of different naming conventions describing a content of the media content into a common naming convention; and
sending a data feed to the client device to populate the user interface on the client device with the normalized collected information, wherein the user interface allows a user to navigate and select the multimedia content that is available for delivery over the Internet for playback on the media player operating on the client device,
wherein the collected information comprises a plurality of fields, each having a value, and wherein the normalizing further comprises:
renaming one or more of the plurality of field names of the collected information based upon the common naming convention to transform the collected information; and
converting one or more of the values of the plurality of fields based upon the common naming convention to transform the collected information.

8. The method of claim 7, wherein the user interface allows the user to navigate and select the multimedia content that is available for delivery over the Internet for playback on the media player operating on the client device without requiring the user to input a Uniform Resource Locator (URL) to one of the plurality of servers.

9. The method of claim 7, wherein the collected information about the multimedia content comprises:
a thumbnail of an image of the multimedia content; and
metadata describing the multimedia content,
wherein the normalizing further comprises:
resizing the thumbnail to a common thumbnail size;
renaming one or more values of the metadata based upon the common naming convention; and
reformatting a site-specific data structure of the metadata into a common data structure.

10. The method of claim 7, wherein the collected information comprises a title or a description, and a Uniform Resource Locator (URL) indicating a web address where the multimedia content is available for delivery over the Internet for playback on the media player.

11. The method of claim 7, wherein the collected information is stored according to a site-specific data structure, and wherein the normalizing further comprises reformatting the site-specific data structure of the collected information into a common data structure.

12. The method of claim 7, wherein the collected information is stored in a plurality of locations on at least one of the plurality of servers according to a site-specific data structure, normalizing further comprises extracting parts of the collected information from different locations of the plurality of locations, and to reorganize the parts of the collected information into a common data structure.

13. An apparatus, comprising:
a processor; and
a non-transitory machine-readable storage medium that provides instructions that, if executed by the processor, will cause the processor to:
collect information on available multimedia content from a plurality of servers, the available multimedia content from the plurality of servers having a plurality of different display formats and having a plurality of different naming conventions describing the content of the media content;
normalizing the collected information by converting the plurality of different display formats of the collected information into a common display format and converting the plurality of different naming conventions describing a content of the media content into a common naming convention; and
send a data feed to a client device to populate a user interface on the client device with the normalized collected information,
wherein the collected information comprises a plurality of fields, each having a value, and wherein the processor is further configured to:
rename one or more of the plurality of field names of the collected information based upon the common naming convention to transform the collected information; and
convert one or more of the values of the plurality of fields based upon the common naming convention to transform the collected information.

14. The apparatus of claim 13, wherein the collected information about the multimedia content comprises:
a thumbnail of an image of the multimedia content; and
metadata describing the multimedia content,
wherein the processor is further configured to:
resizing the thumbnail to a common thumbnail size;
renaming one or more values of the metadata based upon the common naming conventions; and
reformatting a site-specific data structure of the metadata into a common data structure.

15. The apparatus of claim 13, wherein the collected information comprises a title or a description, and a Uniform Resource Locator (URL) indicating a web address where the multimedia content is available for delivery over the Internet for playback on the media player.

16. The apparatus of claim 13, wherein the collected information is stored according to a site-specific data structure, and wherein the processor is further configured to reformat the site-specific data structure of the collected information into a common data structure.

* * * * *